United States Patent
Kasada

(10) Patent No.: US 11,189,318 B2
(45) Date of Patent: *Nov. 30, 2021

(54) MAGNETIC RECORDING MEDIUM AND MAGNETIC RECORDING AND REPRODUCING DEVICE

(71) Applicant: FUJIFILM Corporation, Tokyo (JP)

(72) Inventor: Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/856,853

(22) Filed: Apr. 23, 2020

(65) Prior Publication Data

US 2020/0342906 A1 Oct. 29, 2020

(30) Foreign Application Priority Data

Apr. 26, 2019 (JP) .............................. JP2019-086682

(51) Int. Cl.
| | | |
|---|---|---|
| G11B 5/733 | (2006.01) | |
| G11B 23/02 | (2006.01) | |
| G01B 9/02 | (2006.01) | |
| B08B 3/12 | (2006.01) | |
| G01B 11/30 | (2006.01) | |
| G11B 5/008 | (2006.01) | |

(52) U.S. Cl.
CPC .............. *G11B 23/021* (2013.01); *B08B 3/12* (2013.01); *G01B 9/02* (2013.01); *G01B 11/30* (2013.01); *G11B 5/00813* (2013.01); *G11B 5/733* (2013.01)

(58) Field of Classification Search
None
See application file for complete search history.

(56) References Cited

U.S. PATENT DOCUMENTS

| | | |
|---|---|---|
| 8,535,817 B2 | 9/2013 | Imaoka |
| 10,347,279 B2 | 7/2019 | Ozawa et al. |
| 10,403,318 B2 | 9/2019 | Kurokawa et al. |
| 10,424,330 B2 | 9/2019 | Kasada |
| 10,475,481 B2 | 11/2019 | Oyanagi et al. |
| 10,679,657 B2 | 6/2020 | Kurokawa et al. |
| 10,854,229 B2 | 12/2020 | Ozawa et al. |
| 2011/0274947 A1 | 11/2011 | Ishiguro et al. |
| 2019/0027181 A1 | 1/2019 | Ozawa et al. |
| 2019/0304488 A1 | 10/2019 | Ozawa et al. |

FOREIGN PATENT DOCUMENTS

| | | | |
|---|---|---|---|
| JP | H9-227883 A | | 9/1997 |
| JP | 3575190 B2 | * | 10/2004 |
| JP | 2006002112 A | * | 1/2006 |
| JP | 2007191692 A | * | 8/2007 |
| JP | 2011032400 A | * | 2/2011 |

OTHER PUBLICATIONS

"The Magnetic Recording Medium and Aromatic Polyamide Film," JP 3575190 B2, Published Oct. 13, 2004; English-machine translation. (Year: 2004).*
Office Action dated Nov. 2, 2020 in U.S. Appl. No. 16/368,044.
Notice of Allowance dated Mar. 24, 2021 in U.S. Appl. No. 16/368,044.
Notice of Allowance dated Sep. 7, 2021 in U.S. Appl. No. 16/368,044.

* cited by examiner

*Primary Examiner* — William J Klimowicz
(74) *Attorney, Agent, or Firm* — Sughrue Mion, PLLC

(57) ABSTRACT

The magnetic recording medium includes a non-magnetic support, a magnetic layer including a ferromagnetic powder on one surface of the non-magnetic support, and a back coating layer including a non-magnetic powder on the other surface of the non-magnetic support, in which a difference ($S_{after} - S_{before}$) between a spacing $S_{after}$ measured by optical interferometry regarding a surface of the back coating layer after methyl ethyl ketone cleaning and a spacing $S_{before}$ measured by optical interferometry regarding the surface of the back coating layer before methyl ethyl ketone cleaning is greater than 0 nm and equal to or smaller than 30.0 nm, and the non-magnetic support is an aromatic polyamide support having a moisture absorption of 2.2% or less.

12 Claims, No Drawings

MAGNETIC RECORDING MEDIUM AND MAGNETIC RECORDING AND REPRODUCING DEVICE

CROSS-REFERENCE TO RELATED APPLICATIONS

This application claims priority under 35 U.S.C 119 to Japanese Patent Application No. 2019-086682 filed on Apr. 26, 2019. The above application is hereby expressly incorporated by reference, in its entirety, into the present application.

BACKGROUND OF THE INVENTION

1. Field of the Invention

The present invention relates to a magnetic recording medium and a magnetic recording and reproducing device.

2. Description of the Related Art

A magnetic recording medium (for example, see JP-H9-227883A) is a recording medium useful as a data storage medium for storing a large amount of data (information) for a long period of time.

SUMMARY OF THE INVENTION

The recording of data on a magnetic recording medium and the reproducing thereof are generally performed by mounting the magnetic recording medium on a magnetic recording and reproducing device (referred to as a drive) and allowing the magnetic recording medium to run in the drive. In order to prevent occurrence of errors during the recording and reproducing, it is desired to stabilize the running (improve running stability) of the magnetic recording medium in the drive.

The magnetic recording medium used for data storage is used in a data center in which a temperature and humidity are managed. Meanwhile, in the data center, power saving is necessary for reducing the cost. For realizing the power saving, the managing conditions of the temperature and humidity of the data center can be alleviated compared to the current state, or the managing may not be necessary. However, in a case where the managing conditions of the temperature and humidity are alleviated or the managing is not performed, the magnetic recording medium is assumed to be exposed to an environmental change caused by the weather change or the seasonal change or to be held in various temperature and humidity environments. An example of an environmental change is a temperature change from a low temperature to a high temperature under high humidity. In addition, an example of the temperature and humidity environments is a high temperature and high humidity environment. Therefore, it is desirable that the running of the magnetic recording medium in the drive can be stabilized even after such an environmental change and after storage in such a temperature and humidity environment.

The magnetic recording medium generally has a configuration of including a non-magnetic support and a magnetic layer containing a ferromagnetic powder. In addition, as disclosed in claim 2 of JP1997-227883A (JP-H9-227883A), a back coating layer is formed on a surface of the non-magnetic support of the magnetic recording medium opposite to a surface provided with the magnetic layer. In regard to the non-magnetic support, for example, paragraph 0062 of JP1997-227883A (JP-H9-227883A) discloses various films that can be used as the non-magnetic support.

The inventors have conducted studies regarding the above points, and it was clear that running stability of a magnetic recording medium including an aromatic polyamide support as a non-magnetic support is deteriorated, in a case where the medium recording medium is stored in a high temperature and high humidity environment, after the occurrence of a temperature change from a low temperature to a high temperature under high humidity.

According to one aspect of the invention, an object thereof is to prevent a deterioration in running stability of a magnetic recording medium including an aromatic polyamide support after a temperature change from a low temperature to a high temperature under high humidity and after being held in a high temperature and high humidity environment.

According to one aspect of the invention, there is provided a magnetic recording medium including:

a non-magnetic support;

a magnetic layer including a ferromagnetic powder on one surface of the non-magnetic support; and a back coating layer including a non-magnetic powder on the other surface of the non-magnetic support, in which a difference ($S_{after}-S_{before}$) between a spacing $S_{after}$ measured by optical interferometry regarding a surface of the back coating layer after methyl ethyl ketone cleaning and a spacing $S_{before}$ measured by optical interferometry regarding the surface of the back coating layer before methyl ethyl ketone cleaning (hereinafter, also referred to as a "spacing difference ($S_{after}-S_{before}$) before and after methyl ethyl ketone cleaning" or simply a "difference ($S_{after}-S_{before}$)") is greater than 0 nm and equal to or smaller than 30.0 nm, and the non-magnetic support is an aromatic polyamide support having a moisture absorption of 2.2% or less.

In an embodiment, the difference ($S_{after}-S_{before}$) may be 4.0 nm to 28.0 nm.

In an embodiment, the aromatic polyamide support may have a moisture absorption of 2.0% or less.

In an embodiment, the aromatic polyamide support may have a moisture absorption of 1.0% or more and 2.0% or less.

In an embodiment, the magnetic recording medium may further include a non-magnetic layer including a non-magnetic powder between the non-magnetic support and the magnetic layer.

In an embodiment, the magnetic recording medium may be a magnetic tape.

One aspect of the invention relates to a magnetic recording and reproducing device including the magnetic recording medium and a magnetic head.

According to one embodiment of the invention, it is possible to provide a magnetic recording medium including an aromatic polyamide support, in which a deterioration in running stability is slight, even in a case of being stored in a high temperature and high humidity environment after a temperature change from a low temperature to a high temperature under high humidity, and a magnetic recording and reproducing device including the magnetic recording medium.

DESCRIPTION OF THE PREFERRED EMBODIMENTS

Magnetic Recording Medium

One aspect of the invention relates to a magnetic recording medium including a non-magnetic support, a magnetic layer including a ferromagnetic powder on one surface of the non-magnetic support, and a back coating layer including a non-magnetic powder on the other surface of the non-magnetic support, in which a difference ($S_{after}-S_{before}$) between a spacing $S_{after}$ measured by optical interferometry regarding a surface of the back coating layer after methyl ethyl ketone cleaning and a spacing $S_{before}$ measured by optical interferometry regarding the surface of the back coating layer before methyl ethyl ketone cleaning is greater than 0 nm and equal to or smaller than 30.0 nm, and the non-magnetic support is an aromatic polyamide support having a moisture absorption of 2.2% or less.

In the invention and the specification, the "methyl ethyl ketone cleaning" means ultrasonic cleaning (ultrasonic output: 40 kHz) performed for 100 seconds by dipping a test piece cut out from the magnetic recording medium into methyl ethyl ketone (200 g) at a liquid temperature of 20° C. to 25° C. In a case where the magnetic recording medium to be cleaned is a magnetic tape, a test piece having a length of 5 cm is cut out and subjected to methyl ethyl ketone cleaning. A width of the magnetic tape and a width of the test piece cut out from the magnetic tape is normally ½ inches. 1 inch is 0.0254 meters. Regarding a magnetic tape having a width other than the width of ½ inches, a test piece having a length of 5 cm may be cut out and subjected to methyl ethyl ketone cleaning. In a case where the magnetic recording medium to be cleaned is a magnetic disk, a test piece having a size of 5 cm×1.27 cm is cut out and subjected to methyl ethyl ketone cleaning. The measurement of the spacing after the methyl ethyl ketone cleaning described below is performed, after the test piece after the methyl ethyl ketone cleaning is left in an environment of a temperature of 23° C. and relative humidity of 50% for 24 hours.

In the invention and the specification, the "surface of the back coating layer" of the magnetic recording medium is identical to the surface of the magnetic recording medium on the back coating layer side.

In the invention and the specification, the spacing measured by optical interferometry regarding the surface of the back coating layer of the magnetic recording medium is a value measured by the following method.

In a state where the magnetic recording medium (specifically, the test piece. The same applies hereinafter) and a transparent plate-shaped member (for example, glass plate or the like) are overlapped onto each other so that the surface of the back coating layer of the magnetic recording medium faces the transparent plate-shaped member, a pressing member is pressed against the side of the magnetic recording medium opposite to the back coating layer side at pressure of 0.5 atm (1 atm=101325 Pa (pascals). In this state, the surface of the back coating layer of the magnetic recording medium is irradiated with light through the transparent plate-shaped member (irradiation region: 150,000 to 200,000 µm$^2$), and a spacing (distance) between the surface of the back coating layer of the magnetic recording medium and the surface of the transparent plate-shaped member on the magnetic recording medium is acquired based on intensity (for example, contrast of interference fringe image) of interference light generated due to a difference in a light path between reflected light from the surface of the back coating layer of the magnetic recording medium and reflected light from the surface of the transparent plate-shaped member on the magnetic recording medium. The light emitted here is not particularly limited. In a case where the emitted light is light having an emission wavelength over a comparatively wide wavelength range as white light including light having a plurality of wavelengths, a member having a function of selectively cutting light having a specific wavelength or a wavelength other than wavelengths in a specific wavelength range, such as an interference filter, is disposed between the transparent plate-shaped member and a light receiving unit which receives reflected light, and light at some wavelengths or in some wavelength ranges of the reflected light is selectively incident to the light receiving unit. In a case where the light emitted is light (so-called monochromatic light) having a single luminescence peak, the member described above may not be used. The wavelength of light incident to the light receiving unit can be set to be 500 to 700 nm, for example. However, the wavelength of light incident to the light receiving unit is not limited to be in the range described above. In addition, the transparent plate-shaped member may be a member having transparency through which emitted light passes, to the extent that the magnetic recording medium is irradiated with light through this member and interference light is obtained.

The interference fringe image obtained by the measurement of the spacing described above is divided into 300,000 points, a spacing of each point (distance between the surface of the back coating layer of the magnetic recording medium and the surface of the transparent plate-shaped member on the magnetic recording medium side) is acquired, this spacing is shown with a histogram, and a mode of this histogram is set as the spacing. The difference ($S_{after}-S_{before}$) is a value obtained by subtracting a mode before the methyl ethyl ketone cleaning from a mode after the methyl ethyl ketone cleaning of the 300,000 points.

Two test pieces from the same magnetic recording medium are cut out, a value $S_{before}$ of the spacing is obtained without performing the methyl ethyl ketone cleaning with respect to the one test piece, and a value $S_{after}$ of the spacing is obtained after performing the methyl ethyl ketone cleaning with respect to the other test piece, and the difference ($S_{after}-S_{before}$) may be obtained. Alternatively, the difference ($S_{after}-S_{before}$) may be obtained by acquiring values of the spacing after performing the methyl ethyl ketone cleaning with respect to the test piece, with which the value of the spacing before the methyl ethyl ketone cleaning is acquired.

The above measurement can be performed by using a commercially available tape spacing analyzer (TSA) such as Tape Spacing Analyzer manufactured by Micro Physics, Inc., for example. The spacing measurement of the examples was performed by using Tape Spacing Analyzer manufactured by Micro Physics, Inc.

In the invention and the specification, the "aromatic polyamide" means a polyamide containing an aromatic skeleton, and the "aromatic polyamide support" means a support containing an aromatic polyamide film. The aromatic polyamide support can be a single-layer aromatic polyamide film, or a laminated film of two or more aromatic polyamide films having the same components or two or more aromatic polyamide films having different components. The "aromatic polyamide film" refers to a film in which the component that occupies the largest amount among the components constituting the film based on mass is an aromatic polyamide. The laminated film may optionally include an adhesive layer or the like between two adjacent layers.

In the invention and the specification, the moisture absorption of the aromatic polyamide support is a value determined by the following method.

A test piece (for example, a test piece having a mass of several grams) cut out from the aromatic polyamide support, moisture absorption of which is to be measured, is dried in a vacuum dryer at a temperature of 180° C. and under a pressure of 100 Pa or less until a constant weight is obtained. The mass of the dried test piece is defined as W1. W1 is a value measured in a measurement environment of a temperature of 23° C. and relative humidity of 50% within 30 seconds after being taken out of the vacuum dryer. Next, the mass of this test piece after being placed in an environment of a temperature of 25° C. and relative humidity of 75% for 48 hours is defined as W2. W2 is a value measured in a measurement environment of a temperature of 23° C. and relative humidity of 50% within 30 seconds after being taken out of the environment. The moisture absorption is calculated by the following equation.

Moisture absorption(%)=[(W2−W1)/W1]×100

For example, it is also possible to obtain the moisture absorption of the aromatic polyamide support by the method described above, after removing portions other than the aromatic polyamide support such as the magnetic layer from the magnetic recording medium by a well-known method (for example, film removal using an organic solvent).

Hereinafter, a surmise of the inventors will be described in regard to a point that it is possible to prevent a deterioration in running stability after a temperature change from a low temperature to a high temperature under high humidity and being stored in a high temperature and high humidity environment (hereinafter, also simply referred to as a "deterioration in running stability") by the magnetic recording medium.

The recording of data on a magnetic recording medium and the reproducing thereof are generally performed by allowing the magnetic recording medium to run in the drive. In general, the surface of the back coating layer comes into contact with a drive constituent element in the drive. As an example of the drive constituent element, a roller performing sending and/or winding of the tape-shaped magnetic recording medium (magnetic tape) is used. Here, it is thought that, in a case where a contact state between the drive constituent element and the surface of the back coating layer is unstable, running stability of the magnetic recording medium in the drive is deteriorated.

Meanwhile, it is thought that, in a case where temperature change from a low temperature to a high temperature occurs under high humidity, condensation (attachment of moisture) occurs on the surface of the back coating layer of the magnetic recording medium. It is surmised that the presence of moisture causing an increase in a coefficient of friction during the contact between the surface of the back coating layer and the drive constituent element is a reason of a deterioration in running stability. Therefore, it is thought that, a decrease in amount of moisture attached to the surface of the back coating layer, in a case where a temperature change from a low temperature to a high temperature occurs under high humidity, allows the prevention of an increase in coefficient of friction, thereby preventing a deterioration in running stability.

However, a portion (projection) which mainly comes into contact (so-called real contact) with the drive constituent element during the contact between the surface of the back coating layer and the drive constituent element, and a portion (hereinafter, referred to as a "base portion") having a height lower than that of the portion described above are normally present on the surface of the back coating layer. The inventors have thought that the spacing described above is a value which is an index for a distance between the drive constituent element and the base portion during the contact between the surface of the back coating layer and the drive constituent element. However, it is surmised that, in a case where some components are present on the surface of the back coating layer, as the amount of the components interposed between the base portion and the drive constituent element increases, the spacing is narrowed. Meanwhile, in a case where the components are removed by the methyl ethyl ketone cleaning, the spacing spreads, and accordingly, the value of the spacing $S_{after}$ after the methyl ethyl ketone cleaning is greater than the value of the spacing $S_{before}$ before the methyl ethyl ketone cleaning. Accordingly, it is thought that the difference $(S_{after}-S_{before})$ of the spacings before and after the methyl ethyl ketone cleaning can be an index for the amount of the component interposed between the base portion and the drive constituent element.

In regards to this point, the inventors have thought that the presence of the component removed by the methyl ethyl ketone cleaning on the surface of the back coating layer promotes the attachment of moisture to the surface of the back coating layer, in a case where a temperature change from a low temperature to a high temperature occurs under high humidity. Accordingly, the inventors have thought that, in a case where the difference $(S_{after}-S_{before})$ of the spacings before and after the methyl ethyl ketone cleaning is decreased, that is, a decrease in the amount of the component contributes to prevention of the attachment of moisture, and as a result, this allows the prevention of an increase in coefficient of friction. The inventors have thought that this contributes to preventing a deterioration in running stability due to a temperature change from a low temperature to a high temperature under high humidity. With respect to this, according to the studies of the inventors, a correlation is not found between a value of the difference of spacings before and after cleaning using a solvent other than methyl ethyl ketone, for example, n-hexane, and a value of the difference of spacings before and after methyl ethyl ketone cleaning. It is surmised that this is because the component cannot be removed or cannot be sufficiently removed in the n-hexane cleaning.

Details of the component are not clear. Merely as a surmise, the inventors thought that the component may be a component, a molecular weight of which is greater than that of an organic compound normally added to the back coating layer as an additive. The inventors have surmised as follows regarding one aspect of this component. In an embodiment, the back coating layer is formed by applying a back coating layer forming composition including a binding agent and a curing agent onto a non-magnetic support, in addition to the non-magnetic powder, and performing a curing treatment. With the curing treatment here, it is possible to allow a curing reaction (crosslinking reaction) between the binding agent and the curing agent. However, it is thought that the binding agent which is not subjected to the curing reaction with the curing agent or the binding agent which is insufficiently subjected to the curing reaction with the curing agent is easily separated from the back coating layer and may be present on the surface of the back coating layer. The inventors have surmised that the moisture easily adsorbed to the binding agent (for example, functional group including this binding agent) is a reason of the promotion of the attachment of moisture to the surface of the back coating layer, in a case where a temperature change from a low temperature to a high temperature occurs under high humidity.

In addition, it is thought that, in a case where the non-magnetic support absorbs a large amount of water during storage in a high temperature and high humidity environment, a coefficient of friction during the contact between the surface of the back coating layer of the magnetic recording medium including the non-magnetic support and the drive constituent element may increase. This is considered as one of reasons for a deterioration in running stability after a temperature change from a low temperature to a high temperature under high humidity and storage in a high temperature and high humidity environment. Since the aromatic polyamide support generally tends to absorb moisture, it is surmised that such an increase in the coefficient of friction easily occurs. In contrast, it is thought that, in the magnetic recording medium, the aromatic polyamide support has a moisture absorption of 2.2% or less, and accordingly, the amount of water absorbed by the aromatic polyamide support during storage in a high temperature and high humidity environment is small. It is surmised that this also contributes to preventing a deterioration in running stability.

However, the above description is merely a surmise of the inventors and the invention is not limited thereto. Hereinafter, the magnetic recording medium will be further described in detail.

Non-Magnetic Support

The magnetic recording medium includes an aromatic polyamide support having a moisture absorption of 2.2% or less as a non-magnetic support. From a viewpoint of preventing a deterioration in running stability, the moisture absorption of the aromatic polyamide support is 2.2% or less, preferably 2.1% or less, and more preferably 2.0% or less, even more preferably 1.9% or less, still preferably 1.8% or less, still more preferably 1.7% or less, still even more preferably 1.6% or less, and still furthermore preferably 1.5% or less. In addition, the moisture absorption of the aromatic polyamide support is, for example, 0% or more, more than 0%, 0.1% or more, 0.3% or more, 0.5% or more, 0.7% or more, 1.0% or more, or 1.2% or more. From a viewpoint of preventing a deterioration in running stability, since the aromatic polyamide support preferably has a low moisture absorption, the moisture absorption can also be 0%. It is also preferable to use the aromatic polyamide support having a low moisture absorption as the non-magnetic support of the magnetic recording medium, from a viewpoint of preventing deformation of the magnetic recording medium after long-term storage. For example, it is preferable that the tape-shaped magnetic recording medium (magnetic tape) includes the aromatic polyamide support having a low moisture absorption, from a viewpoint of preventing deformation of the magnetic tape in the tape width direction after long-term storage. In addition, in the magnetic tape, the aromatic polyamide support preferably has a Young's modulus of 3000 N/mm$^2$ or more in a longitudinal direction and 4000 N/mm$^2$ or more in a width direction. From a viewpoint of increasing the capacity of the magnetic recording medium, a surface roughness of one or both surfaces of the aromatic polyamide support is preferably 10 nm or less as a center line average roughness Ra.

An aromatic ring contained in the aromatic skeleton of the aromatic polyamide is not particularly limited, and specific examples of the aromatic ring include a benzene ring and a naphthalene ring. The moisture absorption of the aromatic polyamide support can be controlled by a type and a ratio of the constituent units constituting the aromatic polyamide.

For details of the aromatic polyamide support that can be used as the non-magnetic support of the magnetic recording medium, well-known technologies can be referred to, for example, paragraphs 0007 to 0054 and Examples of JP1997-176306A (JP-H9-176306A) can be referred to. The non-magnetic support may be a biaxially stretched film, and may be a film subjected to corona discharge, plasma treatment, easy adhesion treatment, heat treatment, and the like.

Spacing Difference ($S_{after}-S_{before}$) Before and after Methyl Ethyl Ketone Cleaning The spacing difference ($S_{after}-S_{before}$) before and after methyl ethyl ketone cleaning measured by optical interferometry regarding the surface of the back coating layer of the magnetic recording medium is greater than 0 nm and equal to or smaller than 30.0 nm. A difference ($S_{after}-S_{before}$) of 30.0 nm or less can contribute to preventing a deterioration in running stability in the magnetic recording medium. From this viewpoint, the difference ($S_{after}-S_{before}$) is equal to or smaller than 30.0 nm, preferably equal to or smaller than 29.0 nm, more preferably equal to or smaller than 28.0 nm, even more preferably equal to or smaller than 27.0 nm, still preferably equal to or smaller than 26.0 nm, and still more preferably equal to or smaller than 25.0 nm. As will be described later in detail, the difference ($S_{after}-S_{before}$) can be controlled by a surface treatment of the back coating layer in a manufacturing step of the magnetic recording medium.

In addition, the inventors thought that, as the spacing difference ($S_{after}-S_{before}$) before and after the methyl ethyl ketone cleaning becomes 0 nm, in a case where the surface treatment of the back coating layer is performed, a large amount of the component (for example, lubricant) contributing to the improvement of running stability is removed from the magnetic recording medium. However, this is merely a surmise of the inventors and the invention is not limited thereto. From this viewpoint, the spacing difference ($S_{after}-S_{before}$) of the magnetic recording medium is greater than 0 nm, preferably equal to or greater than 1.0 nm, more preferably equal to or greater than 2.0 nm, even more preferably equal to or greater than 3.0 nm, still preferably equal to or greater than 4.0 nm.

Next, the magnetic layer, the back coating layer, and the non-magnetic support of the magnetic recording medium, and the non-magnetic layer, which is randomly included will be further described.

Magnetic Layer

Ferromagnetic Powder

As the ferromagnetic powder included in the magnetic layer, a well-known ferromagnetic powder used as one kind or in combination of two or more kinds can be used as the ferromagnetic powder used in the magnetic layer of various magnetic recording media. It is preferable to use ferromagnetic powder having a small average particle size, from a viewpoint of improvement of recording density. From this viewpoint, an average particle size of the ferromagnetic powder is preferably 50 nm or less, more preferably 45 nm or less, even more preferably 40 nm or less, further more preferably 35 nm or less, and still preferably 30 nm or less, still more preferably 25 nm or less, and still even more preferably 20 nm or less. On the other hand, from a viewpoint of magnetization stability, the average particle size of the ferromagnetic powder is preferably 5 nm or more, more preferably 8 nm or more, even more preferably 10 nm or more, still preferably 15 nm or more, and still more preferably 20 nm.

Hexagonal Ferrite Powder

As a preferred specific example of the ferromagnetic powder, hexagonal ferrite powder can be used. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the invention and the specification, the "hexagonal ferrite powder" is a ferromagnetic powder in which a hexagonal ferrite type crystal structure is detected as a main phase by X-ray diffraction analysis. The main phase is a structure to which a diffraction peak at the highest intensity in an X-ray diffraction spectrum obtained by the X-ray diffraction analysis belongs. For example, in a case where the diffraction peak at the highest intensity in the X-ray diffraction spectrum obtained by the X-ray diffraction analysis belongs to a hexagonal ferrite type crystal structure, it is determined that the hexagonal ferrite type crystal structure is detected as a main phase. In a case where only a single structure is detected by the X-ray diffraction analysis, this detected structure is set as a main phase. The hexagonal ferrite type crystal structure includes at least an iron atom, a divalent metal atom, and an oxygen atom as constituting atoms. A divalent metal atom is a metal atom which can be divalent cations as ions, and examples thereof include an alkali earth metal atom such as a strontium atom, a barium atom, or a calcium atom, and a lead atom. In the invention and the specification, the hexagonal strontium ferrite powder is powder in which a main divalent metal atom included in this powder is a strontium atom, and the hexagonal barium ferrite powder is a powder in which a main divalent metal atom included in this powder is a barium atom. The main divalent metal atom is a divalent metal atom occupying the greatest content in the divalent metal atom included in the powder based on atom %. However, the divalent metal atom described above does not include rare earth atom. The "rare earth atom" of the invention and the specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder which is one aspect of the hexagonal ferrite powder will be described more specifically.

An activation volume of the hexagonal strontium ferrite powder is preferably 800 to 1600 $nm^3$. The atomized hexagonal strontium ferrite powder showing the activation volume in the range described above is suitable for manufacturing a magnetic recording medium exhibiting excellent electromagnetic conversion characteristics. The activation volume of the hexagonal strontium ferrite powder is preferably equal to or greater than 800 $nm^3$, and can also be, for example, equal to or greater than 850 $nm^3$. In addition, from a viewpoint of further improving the electromagnetic conversion characteristics, the activation volume of the hexagonal strontium ferrite powder is more preferably equal to or smaller than 1500 $nm^3$, even more preferably equal to or smaller than 1400 $nm^3$, still preferably equal to or smaller than 1300 $nm^3$, still more preferably equal to or smaller than 1200 $nm^3$, and still even more preferably equal to or smaller than 1100 $nm^3$. The same applies to the activation volume of the hexagonal barium ferrite powder.

The "activation volume" is a unit of magnetization reversal and an index showing a magnetic magnitude of the particles. Regarding the activation volume and an anisotropy constant Ku which will be described later disclosed in the invention and the specification, magnetic field sweep rates of a coercivity Hc measurement part at time points of 3 minutes and 30 minutes are measured by using an oscillation sample type magnetic-flux meter (measurement temperature: 23° C.±1° C.), and the activation volume and the anisotropy constant Ku are values acquired from the following relational expression of Hc and an activation volume V. A unit of the anisotropy constant Ku is 1 erg/cc=1.0×10$^{-1}$ J/m$^3$.

$$Hc=2Ku/Ms\{1-[(kT/KuV)\ln(At/0.693)]^{1/2}\}$$

[In the expression, Ku: anisotropy constant (unit: J/m$^3$), Ms: saturation magnetization (unit: kA/m), k: Boltzmann's constant, T: absolute temperature (unit: K), V: activation volume (unit: cm$^3$), A: spin precession frequency (unit: s$^{-1}$), and t: magnetic field reversal time (unit: s)]

The anisotropy constant Ku can be used as an index of reduction of thermal fluctuation, that is, improvement of thermal stability. The hexagonal strontium ferrite powder can preferably have Ku equal to or greater than 1.8×105 J/m$^3$, and more preferably have Ku equal to or greater than 2.0×105 J/m$^3$. In addition, Ku of the hexagonal strontium ferrite powder can be, for example, equal to or smaller than 2.5×105 J/m$^3$. However, the high Ku is preferable, because it means high thermal stability, and thus, Ku is not limited to the exemplified value.

The hexagonal strontium ferrite powder may or may not include the rare earth atom. In a case where the hexagonal strontium ferrite powder includes the rare earth atom, a content (bulk content) of the rare earth atom is preferably 0.5 to 5.0 atom % with respect to 100 atom % of the iron atom. In one aspect, the hexagonal strontium ferrite powder including the rare earth atom can have rare earth atom surface layer portion uneven distribution. The "rare earth atom surface layer portion uneven distribution" of the invention and the specification means that a content of rare earth atom with respect to 100 atom % of iron atom in a solution obtained by partially dissolving the hexagonal strontium ferrite powder with acid (hereinafter, referred to as a "rare earth atom surface layer portion content" or simply a "surface layer portion content" regarding the rare earth atom) and a content of rare earth atom with respect to 100 atom % of iron atom in a solution obtained by totally dissolving the hexagonal strontium ferrite powder with acid (hereinafter, referred to as a "rare earth atom bulk content" or simply a "bulk content" regarding the rare earth atom) satisfy a ratio of rare earth atom surface layer portion content/rare earth atom bulk content>1.0.

The content of rare earth atom of the hexagonal strontium ferrite powder which will be described later is identical to the rare earth atom bulk content. With respect to this, the partial dissolving using acid is to dissolve the surface layer portion of particles configuring the hexagonal strontium ferrite powder, and accordingly, the content of rare earth atom in the solution obtained by the partial dissolving is the content of rare earth atom in the surface layer portion of the particles configuring the hexagonal strontium ferrite powder. The rare earth atom surface layer portion content satisfying a ratio of "rare earth atom surface layer portion content/rare earth atom bulk content>1.0" means that the rare earth atoms are unevenly distributed in the surface layer portion (that is, a larger amount of the rare earth atoms is present, compared to that inside), among the particles configuring the hexagonal strontium ferrite powder. The surface layer portion of the invention and the specification means a part of the region of the particles configuring the hexagonal strontium ferrite powder from the inside from the surface.

In a case where the hexagonal strontium ferrite powder includes the rare earth atom, a content (bulk content) of the rare earth atom is preferably 0.5 to 5.0 atom % with respect to 100 atom % of the iron atom. It is thought that the hexagonal strontium ferrite powder including the rare earth atom having the bulk content in the range described above and uneven distribution of the rare earth atom in the surface layer portion of the particles configuring the hexagonal strontium ferrite powder contribute to the prevention of reduction of reproduction output during the repeated reproduction. It is surmised that this is because the anisotropy constant Ku can be increased due to the hexagonal strontium ferrite powder including the rare earth atom having the bulk content in the range described above and uneven distribution of the rare earth atom in the surface layer portion of the particles configuring the hexagonal strontium ferrite powder. As the value of the anisotropy constant Ku is high, occurrence of a phenomenon, so-called thermal fluctuation can be prevented (that is, thermal stability can be improved). By preventing the occurrence of thermal fluctuation, it is possible to prevent reduction of the reproduction output during the repeated reproduction. It is surmised that, the uneven distribution of the rare earth atom in the particle surface layer portion of the hexagonal strontium ferrite powder contributes to stabilization of a spin at an iron (Fe) site in a crystal lattice of the surface layer portion, thereby increasing the anisotropy constant Ku.

It is surmised that the use of the hexagonal strontium ferrite powder having the rare earth atom surface layer portion uneven distribution as the ferromagnetic powder of the magnetic layer contributes to the prevention of chipping of the surface of the magnetic layer due to the sliding with the magnetic head. That is, it is surmised that the hexagonal strontium ferrite powder having the rare earth atom surface layer portion uneven distribution also contributes to the improvement of running durability of the magnetic recording medium. It is surmised that this is because the uneven distribution of the rare earth atom on the surface of the particles configuring the hexagonal strontium ferrite powder contributes to improvement of an interaction between the surface of the particles and an organic substance (for example, binding agent and/or additive) included in the magnetic layer, thereby improving hardness of the magnetic layer.

From a viewpoint of further preventing the reproduction output in the repeated reproduction and/or a viewpoint of further improving running durability, the content of rare earth atom (bulk content) is more preferably 0.5 to 4.5 atom %, even more preferably 1.0 to 4.5 atom %, and still preferably 1.5 to 4.5 atom %.

The bulk content is a content obtained by totally dissolving the hexagonal strontium ferrite powder. In the invention and the specification, the content of the atom is a bulk content obtained by totally dissolving the hexagonal strontium ferrite powder, unless otherwise noted. The hexagonal strontium ferrite powder including the rare earth atom may include only one kind of rare earth atom or may include two or more kinds of rare earth atom, as the rare earth atom. In a case where two or more kinds of rare earth atom are included, the bulk content is obtained from the total of the two or more kinds of rare earth atom. The same also applies to the other components of the invention and the specification. That is, for a given component, only one kind may be used or two or more kinds may be used, unless otherwise noted. In a case where two or more kinds are used, the content is a content of the total of the two or more kinds.

In a case where the hexagonal strontium ferrite powder includes the rare earth atom, the rare earth atom included therein may be any one or more kinds of the rare earth atom. Examples of the rare earth atom preferable from a viewpoint of further preventing reduction of the reproduction output during the repeated reproduction include a neodymium atom, a samarium atom, an yttrium atom, and a dysprosium atom, a neodymium atom, a samarium atom, an yttrium atom are more preferable, and a neodymium atom is even more preferable.

In the hexagonal strontium ferrite powder having the rare earth atom surface layer portion uneven distribution, a degree of uneven distribution of the rare earth atom is not limited, as long as the rare earth atom is unevenly distributed in the surface layer portion of the particles configuring the hexagonal strontium ferrite powder. For example, regarding the hexagonal strontium ferrite powder having the rare earth atom surface layer portion uneven distribution, a ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" is greater than 1.0 and can be equal to or greater than 1.5. The "surface layer portion/bulk content" greater than 1.0 means that the rare earth atom is unevenly distributed in the surface layer portion (that is, a larger amount of the rare earth atoms is present, compared to that inside), among the particles configuring the hexagonal strontium ferrite powder. In addition, the ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, in the hexagonal strontium ferrite powder having the rare earth atom surface layer portion uneven distribution, the "surface layer portion content/bulk content" is not limited to the exemplified upper limit or the lower limit, as long as the rare earth atom is unevenly distributed in the surface layer portion of the particles configuring the hexagonal strontium ferrite powder.

The partial dissolving and the total dissolving of the hexagonal strontium ferrite powder will be described below. Regarding the hexagonal strontium ferrite powder present as the powder, sample powder for the partial dissolving and the total dissolving are collected from powder of the same batch. Meanwhile, regarding the hexagonal strontium ferrite powder included in a magnetic layer of a magnetic recording medium, a part of the hexagonal strontium ferrite powder extracted from the magnetic layer is subjected to the partial dissolving and the other part is subjected to the total dissolving. The extraction of the hexagonal strontium ferrite powder from the magnetic layer can be performed by a method disclosed in a paragraph 0032 of JP2015-091747A.

The partial dissolving means dissolving performed so that the hexagonal strontium ferrite powder remaining in the solution can be visually confirmed at the time of the completion of the dissolving. For example, by performing the partial dissolving, a region of the particles configuring the hexagonal strontium ferrite powder which is 10% to 20% by mass with respect to 100% by mass of a total of the particles can be dissolved. On the other hand, the total dissolving means dissolving performed until the hexagonal strontium ferrite powder remaining in the solution is not visually confirmed at the time of the completion of the dissolving.

The partial dissolving and the measurement of the surface layer portion content are, for example, performed by the following method. However, dissolving conditions such as the amount of sample powder and the like described below are merely examples, and dissolving conditions capable of performing the partial dissolving and the total dissolving can be randomly used.

A vessel (for example, beaker) containing 12 mg of sample powder and 10 ml of hydrochloric acid having a concentration of 1 mol/L is held on a hot plate at a set temperature of 70° C. for 1 hour. The obtained solution is filtered with a membrane filter having a hole diameter of 0.1 μm. The element analysis of the filtrate obtained as described above is performed by an inductively coupled plasma (ICP) analysis device. By doing so, the rare earth atom surface layer portion content with respect to 100 atom % of the iron atom can be obtained. In a case where a plurality of kinds of rare earth atoms are detected from the element analysis, a total content of the entirety of the rare earth atoms is the surface layer portion content. The same applies to the measurement of the bulk content.

Meanwhile, the total dissolving and the measurement of the bulk content are, for example, performed by the following method.

A vessel (for example, beaker) containing 12 mg of sample powder and 10 ml of hydrochloric acid having a concentration of 4 mol/L is held on a hot plate at a set temperature of 80° C. for 3 hours. After that, the process is performed in the same manner as in the partial dissolving and the measurement of the surface layer portion content, and the bulk content with respect to 100 atom % of the iron atom can be obtained.

From a viewpoint of increasing reproducing output in a case of reproducing data recorded on a magnetic recording medium, it is desirable that the mass magnetization σs of ferromagnetic powder included in the magnetic recording medium is high. In regards to this point, in hexagonal strontium ferrite powder which includes the rare earth atom but does not have the rare earth atom surface layer portion uneven distribution, σs tends to significantly decrease, compared to that in hexagonal strontium ferrite powder not including the rare earth atom. With respect to this, it is thought that the hexagonal strontium ferrite powder having the rare earth atom surface layer portion uneven distribution is preferable for preventing such a significant decrease in σs. In one aspect, σs of the hexagonal strontium ferrite powder can be equal to or greater than 45 A·m²/kg and can also be equal to or greater than 47 A·m²/kg. On the other hand, from a viewpoint of noise reduction, σs is preferably equal to or smaller than 80 A·m²/kg and more preferably equal to or smaller than 60 A·m²/kg. σs can be measured by using a well-known measurement device capable of measuring magnetic properties such as an oscillation sample type magnetic-flux meter. In the invention and the specification, the mass magnetization σs is a value measured at a magnetic field strength of 15 kOe, unless otherwise noted. 1 kOe= $(10^6/4\pi)$ A/m Regarding the content (bulk content) of the constituting atom in the hexagonal strontium ferrite powder, a content of the strontium atom can be, for example, 2.0 to 15.0 atom % with respect to 100 atom % of the iron atom. In one aspect, in the hexagonal strontium ferrite powder, the divalent metal atom included in this powder can be only a strontium atom. In another aspect, the hexagonal strontium ferrite powder can also include one or more kinds of other divalent metal atoms, in addition to the strontium atom. For example, a barium atom and/or a calcium atom can be included. In a case where the other divalent metal atom other than the strontium atom is included, a content of a barium atom and a content of a calcium atom in the hexagonal strontium ferrite powder respectively can be, for example, 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more kinds of crystal structure can be detected by the X-ray diffraction analysis. For example, in one aspect, in the hexagonal strontium ferrite powder, only the M type crystal structure can be detected by the X-ray diffraction analysis. For example, the M type hexagonal ferrite is represented by a compositional formula of $AFe_{12}O_{19}$. Here, A represents a divalent metal atom, in a case where the hexagonal strontium ferrite powder has the M type, A is only a strontium atom (Sr), or in a case where a plurality of divalent metal atoms are included as A, the strontium atom (Sr) occupies the hexagonal strontium ferrite powder with the greatest content based on atom % as described above. A content of the divalent metal atom in the hexagonal strontium ferrite powder is generally determined according to the type of the crystal structure of the hexagonal ferrite and is not particularly limited. The same applies to a content of an iron atom and a content of an oxygen atom. The hexagonal strontium ferrite powder at least includes an iron atom, a strontium atom, and an oxygen atom, and can further include a rare earth atom. In addition, the hexagonal strontium ferrite powder may or may not include atoms other than these atoms. As an example the hexagonal strontium ferrite powder may include an aluminum atom (Al). A content of the aluminum atom can be, for example, 0.5 to 10.0 atom % with respect to 100 atom % of the iron atom. From a viewpoint of further preventing the reduction of the reproducing output during the repeated reproduction, the hexagonal strontium ferrite powder includes the iron atom, the strontium atom, the oxygen atom, and the rare earth atom, and a content of the atoms other than these atoms is preferably equal to or smaller than 10.0 atom %, more preferably 0 to 5.0 atom %, and may be 0 atom % with respect to 100 atom % of the iron atom. That is, in one aspect, the hexagonal strontium ferrite powder may not include atoms other than the iron atom, the strontium atom, the oxygen atom, and the rare earth atom. The content shown with atom % described above is obtained by converting a value of the content (unit: % by mass) of each atom obtained by totally dissolving the hexagonal strontium ferrite powder into a value shown as atom % by using the atomic weight of each atom. In addition, in the invention and the specification, a given atom which is "not included" means that the content thereof obtained by performing total dissolving and measurement by using an ICP analysis device is 0% by mass. A detection limit of the ICP analysis device is generally equal to or smaller than 0.01 ppm (parts per million) based on mass. The expression "not included" is used as a meaning including that a given atom is included with the amount smaller than the detection limit of the ICP analysis device.

In one aspect, the hexagonal strontium ferrite powder does not include a bismuth atom (Bi).

Metal Powder

As a preferred specific example of the ferromagnetic powder, ferromagnetic metal powder can also be used. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

As a preferred specific example of the ferromagnetic powder, an ε-iron oxide powder can also be used. In the invention and the specification, the "ε-iron oxide powder" is a ferromagnetic powder in which an ε-iron oxide type crystal structure is detected as a main phase by X-ray diffraction analysis. For example, in a case where the diffraction peak at the highest intensity in the X-ray diffraction spectrum obtained by the X-ray diffraction analysis belongs to an ε-iron type crystal structure, it is determined that the ε-iron type crystal structure is detected as a main phase. As a producing method of the ε-iron oxide powder, a producing method from a goethite, and a reverse micelle method are known. All of the producing methods is well known. For example, for a method of producing the ε-iron oxide powder in which a part of Fe is substituted with a substitutional atom such as Ga, Co, Ti, Al, or Rh, a description disclosed in J. Jpn. Soc. Powder Metallurgy Vol. 61 Supplement, No. 51, pp. S280-S284, J. Mater. Chem. C, 2013, 1, pp. 5200-5206 can be referred to, for example. However, the producing method of the ε-iron oxide powder which can be used as the ferromagnetic powder in the magnetic layer of the magnetic recording medium is not limited to the method described here.

The activation volume of the ε-iron oxide powder is preferably in a range of 300 to 1500 $nm^3$. The atomized ε-iron oxide powder showing the activation volume in the range described above is suitable for manufacturing a magnetic recording medium exhibiting excellent electromagnetic conversion characteristics. The activation volume of the ε-iron oxide powder is preferably equal to or greater than 300 $nm^3$, and can also be, for example, equal to or greater than 500 $nm^3$. In addition, from a viewpoint of further improving the electromagnetic conversion characteristics, the activation volume of the ε-iron oxide powder is more preferably equal to or smaller than 1400 $nm^3$, even more preferably equal to or smaller than 1300 $nm^3$, still preferably equal to or smaller than 1200 $nm^3$, and still more preferably equal to or smaller than 1100 $nm^3$.

The anisotropy constant Ku can be used as an index of reduction of thermal fluctuation, that is, improvement of thermal stability. The ε-iron oxide powder can preferably have Ku equal to or greater than $3.0 \times 10^4$ $J/m^3$, and more preferably have Ku equal to or greater than $8.0 \times 10^4$ $J/m^3$. In addition, Ku of the ε-iron oxide powder can be, for example, equal to or smaller than $3.0 \times 10^5$ $J/m^3$. However, the high Ku is preferable, because it means high thermal stability, and thus, Ku is not limited to the exemplified value.

From a viewpoint of increasing reproducing output in a case of reproducing data recorded on a magnetic recording medium, it is desirable that the mass magnetization σs of ferromagnetic powder included in the magnetic recording medium is high. In regard to this point, in one aspect, σs of the ε-iron oxide powder can be equal to or greater than 8 $A \cdot m^2/kg$ and can also be equal to or greater than 12 $A \cdot m^2/kg$. On the other hand, from a viewpoint of noise reduction, σs of the ε-iron oxide powder is preferably equal to or smaller than 40 $A \cdot m^2/kg$ and more preferably equal to or smaller than 35 $A \cdot m^2/kg$.

In the invention and the specification, average particle sizes of various powder such as the ferromagnetic powder and the like are values measured by the following method with a transmission electron microscope, unless otherwise noted.

The powder is imaged at an imaging magnification ratio of 100,000 with a transmission electron microscope, the image is printed on photographic printing paper or displayed on a display so that the total magnification ratio of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of a plurality of particles is not limited to an aspect in which particles configuring the aggregate directly come into contact with each other, but also includes an aspect in which a binding agent, an additive, or the like which will be described later is interposed between the particles. A term, particles may be used for representing the powder.

As a method of collecting a sample powder from the magnetic recording medium in order to measure the particle size, a method disclosed in a paragraph 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably 50% to 90% by mass and more preferably 60% to 90% by mass. A high filling percentage of the ferromagnetic powder in the magnetic layer is preferable from a viewpoint of improvement of recording density.

Binding Agent and Curing Agent

The magnetic recording medium can be a coating type magnetic recording medium, and can include a binding agent in the magnetic layer. The binding agent is one or more kinds of resin. As the binding agent, various resins generally used as the binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. The resin may be a homopolymer or a copolymer. These resins can be used as the binding agent even in the back coating layer and/or a non-magnetic layer which will be described later.

For the binding agent described above, description disclosed in paragraphs 0028 to 0031 of JP2010-024113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC) under the following measurement conditions. The weight-average molecular weight of the binding agent shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter) × 30.0 cm)

Eluent: Tetrahydrofuran (THF)

In an embodiment, as the binding agent, a binding agent including an active hydrogen-containing group can be used. The "active hydrogen-containing group" in the invention and the specification is a functional group capable of forming a crosslinked structure by a curing reaction of this group with a curable functional group and desorption of hydrogen atoms included in this group. Examples of the active hydrogen-containing group include a hydroxy group, an amino group (preferably a primary amino group or a secondary amino group), a mercapto group, and a carboxy group, a hydroxy group, an amino group and a mercapto group are preferable, and a hydroxy group is more preferable. A concentration of the active hydrogen-containing group in the binding agent including the active hydrogen-containing group is preferably 0.10 meq/g to 2.00 meq/g. eq indicates equivalent and is a unit not convertible into SI unit. In addition, the concentration of the active hydrogen-containing group can also be shown with a unit "mgKOH/g". In an embodiment, the concentration of the active hydrogen-containing group in the resin including the active hydrogen-containing group is preferably 1 to 20 mgKOH/g.

In one aspect, as the binding agent, a binding agent including an acidic group can be used. The "acidic group" of the invention and the specification is used as a meaning including a state of a group capable of emitting $H^+$ in water or a solvent including water (aqueous solvent) to dissociate anions and salt thereof. Specific examples of the acidic group include a sulfonic acid group ($—SO_3H$), a sulfuric acid group ($—OSO_3H$), a carboxy group, a phosphoric acid group, and salt thereof. For example, salt of sulfonic acid group ($—SO_3H$) is represented by $—SO_3M$, and M represents a group representing an atom (for example, alkali metal atom or the like) which may be cations in water or in an aqueous solvent. The same applies to aspects of salt of various groups described above. As an example of the binding agent including the acidic group, a resin including at least one kind of acidic group selected from the group consisting of a sulfonic acid group and salt thereof (for example, a polyurethane resin or a vinyl chloride resin) can be used. However, the resin included in the magnetic layer is not limited to these resins. In addition, in the binding agent including the acidic group, a content of the acidic group can be, for example, 0.03 to 0.50 meq/g. The content of various functional groups such as the acidic group included in the resin can be obtained by a well-known method in accordance with the kind of the functional group. The amount of the binding agent used in a magnetic layer forming composition can be, for example, 1.0 to 30.0 parts by mass with respect to 100.0 parts by mass of the ferromagnetic powder.

In addition, a curing agent can also be used together with the resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. This point is the same as regarding a layer formed by using a composition, in a case where the composition used for forming the other layer includes the curing agent. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of the magnetic layer.

The description regarding the binding agent and the curing agent described above can also be applied to the back coating layer and/or the non-magnetic layer. In this case, the description regarding the content can be applied by replacing the ferromagnetic powder with the non-magnetic powder.

Additives

The magnetic layer includes may include one or more kinds of additives, if necessary. As the additives, the curing agent described above is used as an example. In addition, examples of the additive included in the magnetic layer include non-magnetic powder (for example, inorganic powder or carbon black), a lubricant, a dispersing agent, a dispersing assistant, an antibacterial agent, an antistatic agent, and an antioxidant. As the non-magnetic powder, non-magnetic powder which can function as an abrasive, non-magnetic powder (for example, non-magnetic colloid particles) which can function as a projection formation agent which forms projections suitably protruded from the surface of the magnetic layer, and the like can be used. An average particle size of colloidal silica (silica colloid particles) shown in the examples which will be described later is a value obtained by a method disclosed in a measurement method of an average particle diameter in a paragraph 0015 of JP2011-048878A. As the additives, a commercially available product can be suitably selected according to the desired properties or manufactured by a well-known method, and can be used with any amount. As an example of the additive which can be used in the magnetic layer including the abrasive, a dispersing agent disclosed in paragraphs 0012 to 0022 of JP2013-131285A can be used as a dispersing agent for improving dispersibility of the abrasive. For example, for the lubricant, a description disclosed in paragraphs 0030 to 0033, 0035, and 0036 of JP2016-126817A can be referred to. The non-magnetic layer may include the lubricant. For the lubricant which may be included in the non-magnetic layer, a description disclosed in paragraphs 0030, 0031, 0034, 0035, and 0036 of JP2016-126817A can be referred to. For the dispersing agent, a description disclosed in paragraphs 0061 and 0071 of JP2012-133837A can be referred to. In addition, for the dispersing agent, a description disclosed in paragraphs 0061 and 0071 of JP2012-133837, and paragraph 0035 of JP2017-016721A can also be referred to. For the additive of the magnetic layer, a description disclosed in paragraphs 0035 to 0077 of JP2016-051493A can also be referred to.

The dispersing agent may be included in the non-magnetic layer. For the dispersing agent which may be included in the non-magnetic layer, a description disclosed in a paragraph 0061 of JP2012-133837A can be referred to.

As various additives, a commercially available product can be suitably selected according to the desired properties or manufactured by a well-known method, and can be used with any amount.

The magnetic layer described above can be provided on the surface of the non-magnetic support directly or indirectly through the non-magnetic layer.

Non-Magnetic Layer

Next, the non-magnetic layer will be described. The magnetic recording medium may include a magnetic layer directly on the non-magnetic support or may include a non-magnetic layer including the non-magnetic powder between the non-magnetic support and the magnetic layer.

The non-magnetic powder used in the non-magnetic layer may be powder of an inorganic substance or powder of an organic substance. In addition, carbon black and the like can be used. Examples of the inorganic substance include metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black capable of being used in the non-magnetic layer, a description disclosed in paragraphs 0040 and 0041 of JP2010-024113A can be referred to. The content (filling percentage) of the non-magnetic powder of the non-magnetic layer is preferably 50% to 90% by mass and more preferably 60% to 90% by mass.

The non-magnetic layer can include a binding agent and can also include additives. In regards to details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the invention and the specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 100 Oe, or a layer having a residual magnetic flux density equal to or smaller than 10 mT and coercivity equal to or smaller than 100 Oe. It is preferable that the non-magnetic layer does not have a residual magnetic flux density and coercivity.

Back Coating Layer

The magnetic recording medium includes a back coating layer including a non-magnetic powder on a surface of the non-magnetic support opposite to the surface provided with the magnetic layer. Regarding the kind of the non-magnetic powder included in the back coating layer, the description regarding the non-magnetic powder included in the non-magnetic layer can be referred to. The non-magnetic powder included in the back coating layer can be preferably one or more kinds of non-magnetic powder selected from the group consisting of inorganic powder and carbon black. For example, the magnetic recording medium can include an inorganic powder, as main powder of the non-magnetic powder in the back coating layer (non-magnetic powder, the largest amount of which is included based on mass, among the non-magnetic powder). In a case where the non-magnetic powder included in the back coating layer is one or more kinds of the non-magnetic powder selected from the group consisting of the inorganic powder and carbon black, a percentage of the inorganic powder with respect to 100.0 parts by mass of a total amount of the non-magnetic powder can be, for example, greater than 50.0 parts by mass and equal to or smaller than 100.0 parts by mass and more preferably 60.0 parts by mass to 100.0 parts by mass. In a case where the percentage of the inorganic powder in the non-magnetic powder is increased, the value of the difference ($S_{after}-S_{before}$) tends to decrease in some cases.

An average particle size of the non-magnetic powder can be, for example, 10 to 200 nm. An average particle size of the inorganic powder is preferably 50 to 200 nm and more preferably 80 to 150 nm. Meanwhile, an average particle size of the carbon black is preferably 10 to 50 nm and more preferably 15 to 30 nm.

The back coating layer can include a binding agent and can also include additives. As an example of the additive, a well-known dispersing agent which can contribute to improvement in dispersibility of the non-magnetic powder can be used.

In addition, as an example of the additive, a lubricant is also used.

For example, as the lubricant, fatty acid, fatty acid ester, and fatty acid amide can be used, and a magnetic layer can be formed by using one or more kinds selected from the group consisting of fatty acid, fatty acid ester, and fatty acid amide.

Examples of fatty acid include lauric acid, myristic acid, palmitic acid, stearic acid, oleic acid, linoleic acid, linolenic acid, behenic acid, erucic acid, and elaidic acid, stearic acid, myristic acid, and palmitic acid are preferable, and stearic acid is more preferable. Fatty acid may be included in the magnetic layer in a state of salt such as metal salt.

As fatty acid ester, esters of lauric acid, myristic acid, palmitic acid, stearic acid, oleic acid, linoleic acid, linolenic acid, behenic acid, erucic acid, and elaidic acid can be used, for example. Specific examples thereof include butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

As fatty acid amide, amide of various fatty acid described above is used, and examples thereof include lauric acid amide, myristic acid amide, palmitic acid amide, and stearic acid amide.

A content of fatty acid in the back coating layer is, for example, 0 to 10.0 parts by mass, preferably 0.1 to 10.0 parts by mass, and more preferably 1.0 to 7.0 parts by mass with respect to 100.0 parts by mass of non-magnetic powder included in the back coating layer. A content of fatty acid ester in the back coating layer is, for example, 0.1 to 10.0 parts by mass and preferably 1.0 to 5.0 parts by mass with respect to 100.0 parts by mass of non-magnetic powder included in the back coating layer. A content of fatty acid amide in the back coating layer is, for example, 0 to 3.0 parts by mass, preferably 0 to 2.0 parts by mass, and more preferably 0 to 1.0 part by mass with respect to 100.0 parts by mass of the non-magnetic powder included in the back coating layer.

In the invention and the specification, a given component may be used alone or used in combination of two or more kinds thereof, unless otherwise noted. In a case where two or more kinds of given components are used, the content is a total content of the two or more kinds of components.

In regards to the binding agent included in the back coating layer and various additives, a well-known technology regarding the back coating layer can be applied, and a well-known technology regarding the list of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Various Thicknesses

The thickness of the non-magnetic support of the magnetic recording medium is, for example, 3.0 to 80.0 µm, preferably 3.0 to 50.0 µm, and more preferably 3.0 to 10.0 µm. In a case where the non-magnetic support is a laminated film of two or more layers, the thickness of the non-magnetic support is a total thickness of the laminated film.

A thickness of the magnetic layer can be optimized according to the amount of a saturation magnetization of a magnetic head used, a head gap length, a recording signal band, and the like, and is, for example, 10 nm to 100 nm, and is preferably 20 to 90 nm and more preferably 30 to 70 nm, from a viewpoint of realization of high-density recording. The magnetic layer may be at least one layer, or the magnetic layer can be separated to two or more layers having magnetic properties, and a configuration regarding a well-known multilayered magnetic layer can be applied. A thickness of the magnetic layer which is separated into two or more layers is a total thickness of the layers.

A thickness of the non-magnetic layer is, for example, equal to or greater than 50 nm, preferably equal to or greater than 70 nm, and more preferably equal to or greater than 100 nm. Meanwhile, the thickness of the non-magnetic layer is, for example, preferably equal to or smaller than 800 nm, and more preferably equal to or smaller than 500 nm.

A thickness of the back coating layer is preferably equal to or smaller than 0.9 µm and even more preferably 0.1 to 0.7 µm.

The thicknesses of various layers and the non-magnetic support of the magnetic recording medium can be obtained by a well-known film thickness measurement method. As an example, a cross section of the magnetic recording medium in a thickness direction is exposed by a well-known method of ion beams or microtome, and the exposed cross section is observed with a scanning electron microscope. In the cross section observation, various thicknesses can be obtained as the thickness obtained at any one portion, or as an arithmetical mean of thicknesses obtained at a plurality of portions which are two or more portions randomly extracted, for example, two portions. Alternatively, the thickness of each layer may be obtained as a designed thickness calculated under the manufacturing conditions.

Manufacturing Method

Preparation of Each Layer Forming Composition

Composition for forming the magnetic layer, the back coating layer, the non-magnetic layer generally include a solvent, together with the various components described above. As the solvent, various organic solvents generally used for manufacturing a coating type magnetic recording medium can be used. The amount of solvent in each layer forming composition is not particularly limited, and can be identical to that in each layer forming composition of a typical coating type magnetic recording medium. A step of preparing the composition for forming each layer generally includes at least a kneading step, a dispersing step, and a mixing step provided before and after these steps, in a case where necessary. Each step may be divided into two or more stages. All of raw materials used in the invention may be added at an initial stage or in a middle stage of each step. In addition, each raw material may be separately added in two or more steps.

In order to prepare each layer forming composition, a well-known technology can be used. In the kneading step, an open kneader, a continuous kneader, a pressure kneader, or a kneader having a strong kneading force such as an extruder is preferably used. For details of the kneading processes, descriptions disclosed in JP1989-106338A (JP-H01-106338A) and JP1989-079274A (JP-H01-079274A) can be referred to. In addition, in order to disperse each layer forming composition, one or more kinds of dispersion beads selected from the group consisting of glass beads and other dispersion beads can be used as a dispersion medium. As such dispersion beads, zirconia beads, titania beads, and steel beads which are dispersion beads having high specific gravity are suitable. These dispersion beads may be used by optimizing a particle diameter (bead diameter) and a filling percentage of the dispersion beads. As a disperser, a well-known disperser can be used. Each layer forming composition may be filtered by a well-known method before performing the coating step. The filtering can be performed by using a filter, for example. As the filter used in the filtering, a filter having a hole diameter of 0.01 to 3 µm (for example, filter made of glass fiber or filter made of polypropylene) can be used, for example.

Coating Step

The magnetic layer can be formed, for example, by directly applying the magnetic layer forming composition onto the non-magnetic support or performing multilayer coating of the magnetic layer forming composition with the non-magnetic layer forming composition in order or at the same time. The back coating layer can be formed by applying the back coating layer forming composition to a side of the non-magnetic support opposite to a side provided with the magnetic layer (or to be provided with the magnetic layer). For details of the coating for forming each layer, a description disclosed in a paragraph 0051 of JP2010-024113A can be referred to.

Other Steps

After the coating step, various processes such as a drying process, an alignment process of the magnetic layer, and a surface smoothing treatment (calender process) can be performed. For various steps, a description disclosed in paragraphs 0052 to 0057 of JP2010-024113A can be referred to. For example, a homeotropic alignment process can be performed by a well-known method such as a method using a different polar facing magnet. In the alignment zone, a drying speed of the coating layer can be controlled by a temperature, an air flow of the dry air and/or a transporting rate in the alignment zone. In addition, the coating layer may be preliminarily dried before transporting to the alignment zone.

In any stage after the coating step of the back coating layer forming composition, the heating process of a coating layer formed by applying the back coating layer forming composition is preferably performed. This heating process can be performed before and/or after the calender process, for example. The heating process can be, for example, performed by placing a support, on which the coating layer formed by applying the back coating layer forming composition is formed, under heated atmosphere. The heated atmosphere can be an atmosphere at an atmosphere temperature of 65° C. to 90° C., and more preferably an atmosphere at an atmosphere temperature of 65° C. to 75° C. This atmosphere can be, for example, the atmosphere. The heating process under the heated atmosphere can be, for example, performed for 20 to 50 hours. In an embodiment, by performing this heating process, the curing reaction of the curable functional group of the curing agent can proceed.

One Aspect of Manufacturing Method

As one aspect of the manufacturing method of the magnetic recording medium, a manufacturing method including wiping out the surface of the back coating layer with a wiping material permeated with methyl ethyl ketone (hereinafter, also referred to as a "methyl ethyl ketone wiping treatment"), preferably after the heating process can be used. It is thought that the presence of the component capable of being removed by this methyl ethyl ketone wiping treatment, on the surface of the back coating layer, promotes the attachment of moisture to the surface of the back coating layer, in a case where a temperature change from a low temperature to a high temperature occurs under high humidity. The methyl ethyl ketone wiping treatment can be performed by using a wiping material permeated with methyl ethyl ketone, instead of a wiping material used in a dry wiping treatment, based on a dry wiping treatment generally performed in the manufacturing step of the magnetic recording medium. For example, in the tape-shaped magnetic recording medium (magnetic tape), the methyl ethyl ketone wiping treatment can be performed on the surface of the back coating layer, by causing the magnetic tape to run between a sending roller and a winding roller, after or before slitting the magnetic tape to have a width accommodated in a magnetic tape cartridge, and pressing a wiping material (for example, cloth (for example, non-woven fabric) or paper (for example, tissue paper) permeated with methyl ethyl ketone to the surface of the back coating layer of the magnetic tape during running. A running speed of the magnetic tape during the running and a tension applied in a longitudinal direction of the surface of the back coating layer (hereinafter, simply referred to as a "tension") can be identical to treatment conditions generally used in the dry wiping treatment generally performed in the manufacturing step of the magnetic recording medium. For example, a running speed of the magnetic tape in the methyl ethyl ketone wiping treatment can be approximately 60 to 600 m/min, and the tension can be approximately 0.196 to 3.920 N (newton). In addition, the methyl ethyl ketone wiping treatment can be performed at least once. It is preferable to set the treatment conditions and the number of times of the methyl ethyl ketone wiping treatment so that the spacing difference ($S_{after}-S_{before}$) before and after the methyl ethyl ketone cleaning is greater than 0 nm and equal to or smaller than 30.0 nm.

The polishing treatment and/or the dry wiping treatment generally performed in the manufacturing step of the coating type magnetic recording medium (hereinafter, these are referred to as a "dry surface treatment") can also be performed one or more times on the surface of the back coating layer, before and/or after the methyl ethyl ketone wiping treatment. According to the dry surface treatment, for example, foreign materials which are generated during the manufacturing step such as scraps generate due to slitting, and attached to the surface of the back coating layer can be removed, for example.

The tape-shaped magnetic recording medium (magnetic tape) has been described above as an example. Various processes can also be performed on a disk-shaped magnetic recording medium (magnetic disk) with reference to the above description.

The magnetic recording medium according to one aspect of the invention described above can be a magnetic recording medium including an aromatic polyamide support, in which a deterioration in running stability is slight, even in a case of being stored in a high temperature and high humidity environment after a temperature change from a low temperature to a high temperature under high humidity. The temperature change from a low temperature to a high temperature under high humidity is, for example, a temperature change of approximately 15° C. to 50° C. that is from a temperature of higher 0° C. to 15° C. to a temperature of 30° C. to 50° C. in an environment of relative humidity of approximately 70% to 100%. The storage in a high temperature and high humidity environment can be, for example, storage in an environment of a temperature of 30° C. to 50° C. and relative humidity of 70% to 100%.

The magnetic recording medium may be, for example, a tape-shaped magnetic recording medium (magnetic tape). The magnetic tape is normally used to be accommodated and circulated in a magnetic tape cartridge. The magnetic tape cartridge is mounted on the magnetic recording and reproducing device, the magnetic tape runs in the magnetic recording and reproducing device to bring the surface of the magnetic tape (surface of the magnetic layer) and the magnetic head into contact to slide on each other, and accordingly, the recording of data on the magnetic tape and reproducing thereof can be performed. However, the magnetic recording medium according to one aspect of the invention is not limited to the magnetic tape. The magnetic recording medium according to one aspect of the invention is suitable as various magnetic recording media (magnetic tape, or disk-shaped magnetic recording medium (magnetic disk) used in the sliding type magnetic recording and reproducing device. The sliding type device is a device in which the surface of the magnetic layer and the head are in contact with each other and slide, in a case of performing recording of data on the magnetic recording medium and/or reproducing of the recorded data.

A servo pattern can be formed on the magnetic recording medium manufactured as described above by a well-known method, in order to realize tracking control of a magnetic head of the magnetic recording and reproducing device and control of a running speed of the magnetic recording medium. The "formation of the servo pattern" can be "recording of a servo signal". The magnetic recording medium may be a tape-shaped magnetic recording medium (magnetic tape) or a disk-shaped magnetic recording medium (magnetic disk). Hereinafter, the formation of the servo pattern will be described using a magnetic tape as an example.

The servo pattern is generally formed along a longitudinal direction of the magnetic tape. As a method of control using a servo signal (servo control), timing-based servo (TBS), amplitude servo, or frequency servo is used.

As shown in European Computer Manufacturers Association (ECMA)-319, a timing-based servo system is used in a magnetic tape based on a linear-tape-open (LTO) standard (generally referred to as an "LTO tape"). In this timing-based servo system, the servo pattern is configured by continuously disposing a plurality of pairs of magnetic stripes (also referred to as "servo stripes") not parallel to each other in a longitudinal direction of the magnetic tape. As described above, a reason for that the servo pattern is configured with one pair of magnetic stripes not parallel to each other is because a servo signal reading element passing on the servo pattern recognizes a passage position thereof. Specifically, one pair of the magnetic stripes are formed so that a gap thereof is continuously changed along the width direction of the magnetic tape, and a relative position of the servo pattern and the servo signal reading element can be recognized, by the reading of the gap thereof by the servo signal reading element. The information of this relative position can realize the tracking of a data track. Accordingly, a plurality of servo tracks are generally set on the servo pattern along the width direction of the magnetic tape.

The servo band is configured of a servo signal continuous in the longitudinal direction of the magnetic tape. A plurality of servo bands are normally provided on the magnetic tape. For example, the number thereof is 5 in the LTO tape. A region interposed between two adjacent servo bands is called a data band. The data band is configured of a plurality of data tracks and each data track corresponds to each servo track.

In one aspect, as shown in JP2004-318983A, information showing the number of servo band (also referred to as "servo band identification (ID)" or "Unique Data Band Identification Method (UDIM) information") is embedded in each servo band. This servo band ID is recorded by shifting a specific servo stripe among the plurality of pair of servo stripes in the servo band so that the position thereof is relatively deviated in the longitudinal direction of the magnetic tape. Specifically, the position of the shifted specific servo stripe among the plurality of pair of servo stripes is changed for each servo band. Accordingly, the recorded servo band ID becomes unique for each servo band, and therefore, the servo band can be uniquely specified by only reading one servo band by the servo signal reading element.

In a method of uniquely specifying the servo band, a staggered method as shown in ECMA-319 is used. In this staggered method, the group of one pair of magnetic stripes (servo stripe) not parallel to each other which are continuously disposed in the longitudinal direction of the magnetic tape is recorded so as to be shifted in the longitudinal direction of the magnetic tape for each servo band. A combination of this shifted servo band between the adjacent servo bands is set to be unique in the entire magnetic tape, and accordingly, the servo band can also be uniquely specified by reading of the servo pattern by two servo signal reading elements.

In addition, as shown in ECMA-319, information showing the position in the longitudinal direction of the magnetic tape (also referred to as "Longitudinal Position (LPOS) information") is normally embedded in each servo band. This LPOS information is recorded so that the position of one pair of servo stripes are shifted in the longitudinal direction of the magnetic tape, in the same manner as the UDIM information. However, unlike the UDIM information, the same signal is recorded on each servo band in this LPOS information.

Other information different from the UDIM information and the LPOS information can be embedded in the servo band. In this case, the embedded information may be different for each servo band as the UDIM information, or may be common in all of the servo bands, as the LPOS information.

In addition, as a method of embedding the information in the servo band, a method other than the method described above can be used. For example, a predetermined code may be recorded by thinning out a predetermined pair among the group of pairs of the servo stripes.

A servo pattern forming head is also referred to as a servo write head. The servo write head includes pairs of gaps corresponding to the pairs of magnetic stripes by the number of servo bands. In general, a core and a coil are respectively connected to each of the pairs of gaps, and a magnetic field generated in the core can generate leakage magnetic field in the pairs of gaps, by supplying a current pulse to the coil. In a case of forming the servo pattern, by inputting a current pulse while causing the magnetic tape to run on the servo write head, the magnetic pattern corresponding to the pair of gaps is transferred to the magnetic tape, and the servo pattern can be formed. A width of each gap can be suitably set in accordance with a density of the servo patterns to be formed. The width of each gap can be set as, for example, equal to or smaller than 1 μm, 1 to 10 μm, or equal to or greater than 10 μm.

Before forming the servo pattern on the magnetic tape, a demagnetization (erasing) process is generally performed on the magnetic tape. This erasing process can be performed by applying a uniform magnetic field to the magnetic tape by using a DC magnet and an AC magnet. The erasing process includes direct current (DC) erasing and alternating current (AC) erasing. The AC erasing is performed by slowing decreasing an intensity of the magnetic field, while reversing a direction of the magnetic field applied to the magnetic tape. Meanwhile, the DC erasing is performed by adding the magnetic field in one direction to the magnetic tape. The DC erasing further includes two methods. A first method is horizontal DC erasing of applying the magnetic field in one direction along a longitudinal direction of the magnetic tape. A second method is vertical DC erasing of applying the magnetic field in one direction along a thickness direction of the magnetic tape. The erasing process may be performed with respect to all of the magnetic tape or may be performed for each servo band of the magnetic tape.

A direction of the magnetic field to the servo pattern to be formed is determined in accordance with the direction of erasing. For example, in a case where the vertical DC erasing is performed to the magnetic tape, the formation of the servo pattern is performed so that the direction of the magnetic field and the direction of erasing becomes opposite to each other. Accordingly, the output of the servo signal obtained by the reading of the servo pattern can be increased. As disclosed in JP2012-053940A, in a case where the magnetic pattern is transferred to the magnetic tape subjected to the vertical DC erasing by using the gap, the servo signal obtained by the reading of the formed servo pattern has a unipolar pulse shape. Meanwhile, in a case where the magnetic pattern is transferred to the magnetic tape subjected to the horizontal DC erasing by using the gap, the servo signal obtained by the reading of the formed servo pattern has a bipolar pulse shape.

Magnetic Recording and Reproducing Device

One aspect of the invention relates to a magnetic recording and reproducing device including the magnetic recording medium and a magnetic head.

In the invention and the specification, the "magnetic recording and reproducing device" means a device capable of performing at least one of the recording of data on the magnetic recording medium or the reproducing of data recorded on the magnetic recording medium. Such a device is generally called a drive. The magnetic recording and reproducing device can be a sliding type magnetic recording and reproducing device. The magnetic head included in the magnetic recording and reproducing device can be a recording head capable of performing the recording of data on the magnetic recording medium, and can also be a reproducing head capable of performing the reproducing of data recorded on the magnetic recording medium. In addition, in the aspect, the magnetic recording and reproducing device can include both of a recording head and a reproducing head as separate magnetic heads. In another aspect, the magnetic head included in the magnetic recording and reproducing device can also have a configuration of including both of a recording element and a reproducing element in one magnetic head. As the reproducing head, a magnetic head (MR head) including a magnetoresistive (MR) element capable of reading data recorded on the magnetic recording medium with excellent sensitivity as the reproducing element is preferable. As the MR head, various well-known MR heads can be used. In addition, the magnetic head which performs the recording of data and/or the reproducing of data may include a servo pattern reading element. Alternatively, as a head other than the magnetic head which performs the recording of data and/or the reproducing of data, a magnetic head (servo head) including a servo pattern reading element may be included in the magnetic recording and reproducing device.

In the magnetic recording and reproducing device, the recording of data on the magnetic recording medium and the reproducing of data recorded on the magnetic recording medium can be performed by bringing the surface of the magnetic layer of the magnetic recording medium into contact with the magnetic head and sliding. The magnetic recording and reproducing device may include the magnetic recording medium according to the aspect of the invention, and well-known technologies can be applied for the other configurations.

EXAMPLES

Hereinafter, the invention will be described with reference to examples. However, the invention is not limited to aspects shown in the examples. "Parts" and "%" in the following description mean "parts by mass" and "% by mass", unless otherwise noted. In addition, steps and evaluations described below are performed in an environment of an atmosphere temperature of 23° C.±1° C., unless otherwise noted.

Example 1

A list of each layer forming composition is shown below.
List of Magnetic Layer Forming Composition
Magnetic Liquid
Ferromagnetic powder (see Table 1): 100.0 parts
Oleic acid: 2.0 parts
Vinyl chloride copolymer (MR-104 manufactured by Kaneka): 10.0 parts
$SO_3Na$ group-containing polyurethane resin: 4.0 parts (weight average molecular weight: 70,000, $SO_3Na$ group: 0.07 meq/g)
Polyalkylenimine-based polymer (synthetic product obtained by the method disclosed in paragraphs 0115 to 0123 of JP2016-051493A): 6.0 parts
Methyl ethyl ketone: 150.0 parts
Cyclohexanone: 150.0 parts
Abrasive Liquid
α-alumina (BET (Brunauer-Emmett-Teller) specific surface area: 19 $m^2$/g): 6.0 parts
$SO_3Na$ group-containing polyurethane resin: 0.6 parts (Weight average molecular weight: 70,000, $SO_3Na$ group: 0.1 meq/g)
2,3-dihydroxynaphthalene: 0.6 parts
Cyclohexanone: 23.0 parts
Projection Formation Agent Liquid
Colloidal silica (average particle size: 120 nm): 2.0 parts
Methyl ethyl ketone: 8.0 parts
Other components
Stearic acid: 3.0 parts
Stearic acid amide: 0.3 parts
Butyl stearate: 6.0 parts
Methyl ethyl ketone: 110.0 parts
Cyclohexanone: 110.0 parts
Polyisocyanate (CORONATE (registered trademark) L manufactured by Tosoh Corporation): 3 parts
List of Non-Magnetic Layer Forming Composition
Non-magnetic inorganic powder
α-iron oxide (average particle size: 10 nm, BET specific surface area: 75 $m^2$/g): 100.0 parts
Carbon black (average particle size: 20 nm): 25.0 parts SO₃Na group-containing polyurethane resin (weight-average molecular weight: 70,000, SO₃Na group: 0.2 meq/g): 18.0 parts
Stearic acid: 1.0 part
Cyclohexanone: 300.0 parts
Methyl ethyl ketone: 300.0 parts
List of Back Coating Layer Forming Composition
Non-magnetic powder: 100.0 parts
α-iron oxide: see Table 1 as mixing ratio (mass ratio)
    average particle size (average long axis length): 150 nm
average acicular ratio: 7
BET specific surface area: 52 m2/g
Carbon black: see Table 1 as mixing ratio (mass ratio)
Average particle size: 20 nm
A vinyl chloride copolymer (MR-104 manufactured by Kaneka Corporation): 13.0 parts
    (Weight-average molecular weight: 55,000, active hydrogen-containing group (hydroxy group): 0.33 meq/g, OSO3K group (potassium salt of sulfate group): 0.09 meq/g)
SO3Na group-containing polyurethane resin: 6.0 parts
    (Weight-average molecular weight: 70,000, active hydrogen-containing group (hydroxy group): 4 to 6 mgKOH/g, SO₃Na group (sodium salt of sulfonic acid group): 0.07 meq/g)
Phenylphosphonic acid: 3.0 parts
Cyclohexanone: 155.0 parts
Methyl ethyl ketone: 155.0 parts
Stearic acid: 3.0 parts
Butyl stearate: 3.0 parts
Polyisocyanate: 5.0 parts
Cyclohexanone: 200.0 parts
Preparation of Magnetic Layer Forming Composition The magnetic layer forming composition was prepared by the following method.

A magnetic liquid was prepared by dispersing (beads-dispersing) various components of the magnetic liquid with a batch type vertical sand mill for 24 hours. As dispersion beads, zirconia beads having a bead diameter of 0.5 mm were used.

Regarding the abrasive solution, various components of the abrasive solution were mixed with each other and put in a transverse beads mill disperser together with zirconia beads having a bead diameter of 0.3 mm, so as to perform the adjustment so that a value of bead volume/(abrasive solution volume+bead volume) was 80%, the beads mill dispersion process was performed for 120 minutes, the liquid after the process was extracted, and an ultrasonic dispersion filtering process was performed by using a flow type ultrasonic dispersion filtering device. By doing so, the abrasive solution was prepared.

The prepared magnetic liquid, the abrasive solution, the projection formation agent liquid, and the other components were introduced in a dissolver stirrer, and stirred at a circumferential speed of 10 m/sec for 30 minutes. Then, a process at a flow rate of 7.5 kg/min was performed for 3 passes with a flow type ultrasonic disperser, and then, the mixture was filtered with a filter having a hole diameter of 1 μm, to prepare a magnetic layer forming composition.

Preparation of Non-Magnetic Layer Forming Composition

A non-magnetic layer forming composition was prepared by dispersing various components of the non-magnetic layer forming composition described above with a batch type vertical sand mill by using zirconia beads having a bead diameter of 0.1 mm for 24 hours, and then performing filtering with a filter having an average hole diameter of 0.5 μm.

Preparation of Back Coating Layer Forming Composition

Components except a lubricant (stearic acid and butyl stearate), polyisocyanate, and 200.0 parts of cyclohexanone among various components of the back coating layer forming composition were kneaded and diluted by an open kneader, and subjected to a dispersion process of 12 passes, with a transverse beads mill disperser and zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added and stirred with a dissolver, the obtained dispersion liquid was filtered with a filter having an average hole diameter of 1 μm and a back coating layer forming composition was prepared.

Manufacturing of Magnetic Tape

The non-magnetic layer forming composition prepared as described above was applied onto a surface of an aromatic polyamide support having a thickness of 8.0 μm shown in Table 1, so that the thickness after the drying becomes 400 nm, and dried to form a non-magnetic layer. Then, the magnetic layer forming composition prepared as described above was applied onto a surface of the non-magnetic layer so that the thickness after the drying becomes 70 nm, to form a coating layer. A homeotropic alignment process of applying a magnetic field having strength of 0.3 T to the surface of the coating layer in a vertical direction while the coating layer of the magnetic layer forming composition is wet (not dried), and the coating layer was dried. After that, the back coating layer forming composition prepared as described above was applied on the opposite surface of the support so that the thickness after drying becomes 0.4 μm, and dried. By doing so, a magnetic tape original roll was manufactured.

The calender process (surface smoothing treatment) was performed on the manufactured magnetic tape original roll with a calender configured of only a metal roll, at a speed of 100 m/min, linear pressure of 294 kN/m, and a surface temperature of a calender roll of 100° C., and heating process was performed in the environment of the atmosphere temperature shown in Table 1 for a period of time shown in Table 1. After the heating process, a magnetic tape having a width of ½ inches was obtained by slitting the magnetic tape original roll with a cutter. While causing this magnetic tape to run between a sending roller and a winding roller (running speed: 120 m/min, tension: see Table 1), blade polishing of the surface of the back coating layer, the dry wiping treatment, and the methyl ethyl ketone wiping treatment were performed in this order. Specifically, a sapphire blade, a dried wiping material (TORAYSEE (registered trademark) manufactured by Toray Industries, Inc.), and a wiping material permeated with methyl ethyl ketone (TORAYSEE (registered trademark) manufactured by Toray Industries, Inc.) were disposed between the two rollers described above, the sapphire blade was pressed against the surface of the back coating layer of the magnetic tape running between the two rollers for blade polishing, the dry wiping treatment of the surface of the back coating layer was performed with the dried wiping material, and the methyl ethyl ketone wiping treatment of the surface of the back coating layer was performed with the wiping material permeated with methyl ethyl ketone. By doing so, the blade polishing, the dry wiping treatment, and the methyl ethyl ketone wiping treatment were performed on the surface of the back coating layer once.

In a state where the magnetic layer of the manufactured magnetic tape was demagnetized, servo patterns having disposition and shapes according to the linear-tape-open (LTO) Ultrium format were formed on the magnetic layer by using a servo write head mounted on a servo writer.

Accordingly, a magnetic tape including data bands, servo bands, and guide bands in the disposition according to the LTO Ultrium format in the magnetic layer, and including servo patterns having the disposition and the shape according to the LTO Ultrium format on the servo band was obtained.

By doing so, a magnetic tape of Example 1 was obtained.

Examples 2 to 11 and Comparative Examples 1 to 7

Magnetic tapes were manufactured by the same method as in Example 1, except that various conditions were changed as shown in Table 1.

Regarding the surface treatment of the surface of the back coating layer after slitting, the following surface treatments were performed in Examples 2 to 11 and Comparative Examples 1 to 7, respectively.

In Examples 2 to 4 and 7 to 11 and Comparative Examples 6 and 7, the blade polishing, the dry wiping treatment, and the methyl ethyl ketone wiping treatment were performed in the same manner as in Example 1.

In Examples 5 and 6 and Comparative Example 4, the blade polishing, the dry wiping treatment, and the methyl ethyl ketone wiping treatment were performed in the same manner as in Example 1, except that the tension was changed.

In Comparative Examples 1, 3 and 5, the blade polishing and the dry wiping treatment were repeatedly performed in the same manner as in Example 1, and the methyl ethyl ketone wiping treatment was not performed.

In Comparative Example 2, the blade polishing and the dry wiping treatment were performed in the same manner as in Example 1 three times, and methyl ethyl ketone wiping treatment was not performed.

In Table 1, "BaFe" is a hexagonal barium ferrite powder having an average particle size (average plate diameter) of 21 nm.

In Table 1, "SrFe1" is a hexagonal strontium ferrite powder produced by the following method.

1707 g of $SrCO_3$, 687 g of $H3BO3$, 1120 g of $Fe2O3$, 45 g of $Al(OH)3$, 24 g of $BaCO3$, 13 g of $CaCO3$, and 235 g of $Nd2O3$ were weighed and mixed in a mixer to obtain a raw material mixture.

The obtained raw material mixture was dissolved in a platinum crucible at a dissolving temperature of 1390° C., and a tap hole provided on the bottom of the platinum crucible was heated while stirring the dissolved liquid, and the dissolved liquid was tapped in a rod shape at approximately 6 g/sec. The tap liquid was rolled and cooled with a water cooling twin roller to prepare an amorphous body.

280 g of the prepared amorphous body was put into an electronic furnace, heated to 635° C. (crystallization temperature) at a rate of temperature rise of 3.5° C./min, and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1000 g of zirconia beads having a particle diameter of 1 mm and 800 ml of an acetic acid aqueous solution having a concentration of 1% were added to a glass bottle, and a dispersion process was performed in a paint shaker for 3 hours. After that, the obtained dispersion liquid and the beads were dispersed and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder obtained as described above, an average particle size was 18 nm, an activation volume was 902 $nm^3$, an anisotropy constant Ku was 2.2×105 $J/m^3$, and a mass magnetization σs was 49 $A·m^2/kg$.

12 mg of a sample powder was collected from the hexagonal strontium ferrite powder obtained as described above, the element analysis of a filtrate obtained by the partial dissolving of this sample powder under the dissolving conditions described above was performed by the ICP analysis device, and a surface layer portion content of a neodymium atom was obtained.

Separately, 12 mg of a sample powder was collected from the hexagonal strontium ferrite powder obtained as described above, the element analysis of a filtrate obtained by the total dissolving of this sample powder under the dissolving conditions described above was performed by the ICP analysis device, and a bulk content of a neodymium atom was obtained.

The content (bulk content) of the neodymium atom in the hexagonal strontium ferrite powder obtained as described above with respect to 100 atom % of iron atom was 2.9 atom %. In addition, the surface portion content of the neodymium atom was 8.0 atom %. A ratio of the surface portion content and the bulk content, "surface portion content/bulk content" was 2.8 and it was confirmed that the neodymium atom is unevenly distributed on the surface layer of the particles.

A crystal structure of the hexagonal ferrite shown by the powder obtained as described above was confirmed by scanning CuKα ray under the condition of a voltage of 45 kV and intensity of 40 mA and measuring an X-ray diffraction pattern under the following conditions (X-ray diffraction analysis). The powder obtained as described above showed a crystal structure of magnetoplumbite type (M type) hexagonal ferrite. In addition, a crystal phase detected by the X-ray diffraction analysis was a magnetoplumbite type single phase.

PANalytical X'Pert Pro Diffractometer, PIXcel Detector
Soller slit of incident beam and diffraction beam: 0.017 radians
Fixed angle of dispersion slit: ¼ degrees
Mask: 10 mm
Scattering prevention slit: ¼ degrees
Measurement mode: continuous
Measurement time per 1 stage: 3 seconds
Measurement speed: 0.017 degrees per second
Measurement step: 0.05 degrees In Table 1, "SrFe2" is a hexagonal strontium ferrite powder produced by the following method.

1725 g of $SrCO_3$, 666 g of $H3BO3$, 1332 g of $Fe2O3$, 52 g of $Al(OH)3$, 34 g of $CaCO3$, and 141 g of $BaCO3$ were weighed and mixed in a mixer to obtain a raw material mixture.

The obtained raw material mixture was dissolved in a platinum crucible at a dissolving temperature of 1380° C., and a tap hole provided on the bottom of the platinum crucible was heated while stirring the dissolved liquid, and the dissolved liquid was tapped in a rod shape at approximately 6 g/sec. The tap liquid was rolled and cooled with a water cooling twin roll to prepare an amorphous body.

280 g of the obtained amorphous body was put into an electronic furnace, heated to 645° C. (crystallization temperature), and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1000 g of zirconia beads having a particle diameter of 1 mm and 800 ml of an acetic acid aqueous solution having a concentration of 1% were added to a glass bottle, and a dispersion process was performed in a paint shaker for 3 hours. After that, the obtained dispersion liquid and the beads were dispersed and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder obtained as described above, an average particle size was 19 nm, an activation volume was 1102 $nm^3$, an anisotropy constant Ku was $2.0\times105$ $J/m^3$, and a mass magnetization σs was 50 $A·m^2/kg$.

In Table 1, "ε-iron oxide" is an ε-iron oxide powder produced by the following method.

4.0 g of ammonia aqueous solution having a concentration of 25% was added to a material obtained by dissolving 8.3 g of iron (III) nitrate nonahydrate, 1.3 g of gallium (III) nitrate octahydrate, 190 mg of cobalt (II) nitrate hexahydrate, 150 mg of titanium (IV) sulfate, and 1.5 g of polyvinyl pyrrolidone (PVP) in 90 g of pure water, while stirring by using a magnetic stirrer, in an atmosphere under the conditions of an atmosphere temperature of 25° C., and the mixture was stirred for 2 hours still under the temperature condition of the atmosphere temperature of 25° C. A citric acid solution obtained by dissolving 1 g of citric acid in 9 g of pure water was added to the obtained solution and stirred for 1 hour. The powder precipitated after the stirring was collected by centrifugal separation, washed with pure water, and dried in a heating furnace at a furnace inner temperature of 80° C.

800 g of pure water was added to the dried powder and the powder was dispersed in water again, to obtain a dispersion liquid. The obtained dispersion liquid was heated to a liquid temperature of 50° C., and 40 g of ammonia aqueous solution having a concentration of 25% was added dropwise while stirring. The stirring was performed for 1 hour while holding the temperature of 50° C., and 14 mL of tetraethoxysilane (TEOS) was added dropwise and stirred for 24 hours. 50 g of ammonium sulfate was added to the obtained reaction solution, the precipitated powder was collected by centrifugal separation, washed with pure water, and dried in a heating furnace at a furnace inner temperature of 80° C. for 24 hours, and a precursor of ferromagnetic powder was obtained.

The heating furnace at a furnace inner temperature of 1000° C. was filled with the obtained precursor of ferromagnetic powder in the atmosphere and subjected to thermal treatment for 4 hours.

The thermal-treated precursor of ferromagnetic powder was put into sodium hydroxide (NaOH) aqueous solution having a concentration of 4 mol/L, the liquid temperature was held at 70° C., stirring was performed for 24 hours, and accordingly, a silicon acid compound which was an impurity was removed from the thermal-treated precursor of ferromagnetic powder.

After that, by the centrifugal separation process, ferromagnetic powder obtained by removing the silicon acid compound was collected and washed with pure water, and ferromagnetic powder was obtained.

The composition of the obtained ferromagnetic powder was confirmed by Inductively Coupled Plasma-Optical Emission Spectrometry (ICP-OES), and Ga, Co, and Ti substitution type ε-iron oxide (ε-$Ga_{0.28}Co_{0.05}Ti_{0.05}Fe_{1.62}O_3$) was obtained. In addition, the X-ray diffraction analysis was performed under the same conditions as disclosed regarding SrFe1 above, and it was confirmed that the obtained ferromagnetic powder has a crystal structure of a single phase which is an ε phase not including a crystal structure of an α phase and a γ phase (ε-iron oxide type crystal structure) from the peak of the X-ray diffraction pattern.

Regarding the obtained (α-iron oxide powder, an average particle size was 12 nm, an activation volume was 746 $nm^3$, an anisotropy constant Ku was $1.2\times105$ $J/m^3$, and a mass magnetization σs was 16 $A·m^2/kg$.

The activation volume and the anisotropy constant Ku of the hexagonal strontium ferrite powder and the (ε-iron oxide powder are values obtained by the method described above regarding each magnetic powder by using an oscillation sample type magnetic-flux meter (manufactured by Toei Industry Co., Ltd.).

The mass magnetization σs is a value measured using a oscillation sample type magnetic-flux meter (manufactured by Toei Industry Co., Ltd.) at a magnetic field strength of 15 kOe.

In Table 1, "Support 1" shown in the column of type of aromatic polyamide support is an aromatic polyamide film produced by the method disclosed in Example 7 of JP1997-176306A (JP-H9-176306A).

"Support 2" is an aromatic polyamide film produced by the method disclosed in Example 6 of JP1997-176306A (JP-H9-176306A).

"Support 3" is an aromatic polyamide film produced by the method disclosed in Example 3 of JP1997-176306A (JP-H9-176306A).

"Support 4" is an aromatic polyamide film produced by the method disclosed in Comparative Example 3 of JP1997-176306A (JP-H9-176306A).

A test piece of several grams was cut out from each aromatic polyamide support, and the moisture absorption was obtained by the method described above and was a value shown in Table 1.

Evaluation Method (1) Spacing Difference ($S_{after}$–$S_{before}$) Before and after Methyl Ethyl Ketone Cleaning The spacing difference ($S_{after}$–$S_{before}$) before and after the methyl ethyl ketone cleaning was obtained with a Tape Spacing Analyzer (TSA) (manufactured by Micro Physics, Inc.) by the following method.

Two test pieces having a length of 5 cm were cut out from each magnetic tape of the examples and the comparative examples. Regarding one test piece, the methyl ethyl ketone cleaning was not performed and the spacing ($S_{before}$) was obtained by the following method. Regarding the other test piece, the methyl ethyl ketone cleaning was performed by the method described above, and the spacing ($S_{after}$) was obtained by the following method.

In a state where a glass plate (glass plate (model no.: WG10530) manufactured by Thorlabs, Inc.) included in TSA is disposed on the surface of the back coating layer of the magnetic tape (specifically, the test piece), a urethane hemisphere included in TSA as a pressing member was pressed against the surface of the magnetic layer of the magnetic tape with pressure of 0.5 atm. In this state, a certain region (150,000 to 200,000 μm$^2$) of the surface of the back coating layer of the magnetic tape was irradiated with white light from a stroboscope included in the TSA through the glass plate, the obtained reflected light was received with a charge-coupled device (CCD) through an interference filter (filter selectively transmitting light at a wavelength of 633 nm), thereby obtaining an interference fringe image generated on ruggedness of this region.

This image was divided into 300,000 points, a distance (spacing) between the surface of the glass plate of each point on the magnetic tape side and the surface of the back coating layer of the magnetic tape was obtained, this spacing is shown with a histogram, a mode $S_{before}$ of the histogram obtained regarding the test piece not subjected to the methyl ethyl ketone cleaning was subtracted from a mode $S_{after}$ of the histogram obtained regarding the test piece after the methyl ethyl ketone cleaning, and the difference ($S_{after}-S_{before}$) was obtained.

(2) Spacing Difference ($S_{reference}-S_{before}$) Before and after Methyl n-Hexane (Reference Value)

One test piece having a length of 5 cm was further cut out from each magnetic tape of the examples and the comparative examples, the cleaning was performed in the same manner as described above, except that n-hexane was used instead of methyl ethyl ketone, and the spacing was obtained after n-hexane cleaning in the same manner as described above. A difference ($S_{reference}-S_{before}$) between the spacing $S_{reference}$ obtained here, and the spacing $S_{before}$ obtained from the test piece not subjected to the cleaning obtained in the section of (1) was obtained as a reference value.

(3) Evaluation of Deterioration in Running Stability

Each magnetic tape of the examples and the comparative examples was stored in a thermo box in which a temperature was 10° C. and relative humidity was 80%, for 3 hours. After that, the magnetic tape was extracted from the thermo box (in the outside air, a temperature was 23° C. and relative humidity was 50%), and put in a thermo room in which a temperature was 32° C. and relative humidity was 80% within 1 minute, and a position error signal (PES) was obtained by the following method in the thermo room for a week.

Regarding each magnetic tape of the examples and the comparative examples, a servo pattern was read with a verifying head on a servo writer used in the formation of the servo pattern. The verifying head is a magnetic head for reading for confirming quality of the servo pattern formed in the magnetic tape, and an element for reading is disposed on a position corresponding to the position (position of the magnetic tape in a width direction) of the servo pattern, in the same manner as the magnetic head of the well-known magnetic tape device (drive).

In the verifying head, a well-known PES arithmetic circuit which calculates head positioning accuracy of the servo system as the PES is connected from an electrical signal obtained by reading the servo pattern in the verifying head. The PES arithmetic circuit calculates, in a case where necessary, displacement of the magnetic tape in a width direction from the input electrical signal (pulse signal), and a value obtained by applying a high pass filter (cut-off: 500 cycles/m) with respect to a temporal change information (signal) of this displacement was calculated as the PES. The PES can be an index for running stability, and in a case where the calculated PES is equal to or smaller than 18 nm, it is possible to evaluate that a deterioration in running stability due to storage in a high temperature and a high humidity environment after a temperature change from a low temperature to a high temperature under high humidity is prevented.

The result described above is shown in Table 1 (Tables 1-1 to 1-3).

TABLE 1

|  |  | Example 1 | Example 2 | Example 3 | Example 4 | Example 5 |
|---|---|---|---|---|---|---|
| Ferromagnetic powder | | BaFe | BaFe | BaFe | BaFe | BaFe |
| Mixing ratio of non-magnetic powder in back coating layer (α-iron oxide/carbon black) | | 60/40 | 80/20 | 100/0 | 60/40 | 60/40 |
| Heating process | Temperature | 70° C. | 70° C. | 70° C. | 80° C. | 80° C. |
|  | Time | 36 hours | 36 hours | 36 hours | 48 hours | 48 hours |
| Tension (N) | | 0.294 | 0.294 | 0.294 | 0.294 | 0.588 |
| Blade polishing and dry wiping treatment | | 1 time | 1 time | 1 time | 1 time | 1 time |
| Methyl ethyl ketone wiping treatment | | Performed | Performed | Performed | Performed | Performed |
| (Reference value) Spacing difference ($S_{reference} - S_{before}$) before and after n-hexane cleaning (nm) | | 4.0 | 4.0 | 4.0 | 4.0 | 4.0 |
| Spacing difference ($S_{after} - S_{before}$) before and after methyl ethyl ketone cleaning (nm) | | 28.0 | 25.0 | 26.0 | 21.0 | 11.0 |
| Aromatic polyamide support | Type | Support 1 | Support 1 | Support 1 | Support 1 | Support 1 |
|  | Hygroscopic coefficient | 1.4% | 1.4% | 1.4% | 1.4% | 1.4% |
| Evaluation of deterioration in running stability (PES) | | 15 nm | 12 nm | 14 nm | 10 nm | 7 nm |

|  |  | Example 6 | Example 7 | Example 8 | Example 9 | Example 10 | Example 11 |
|---|---|---|---|---|---|---|---|
| Ferromagnetic powder | | BaFe | BaFe | BaFe | SrFe1 | SrFe2 | |
| Mixing ratio of non-magnetic powder in back coating layer (α-iron oxide/carbon black) | | 60/40 | 80/20 | 80/20 | 60/40 | 60/40 | 60/40 |

TABLE 1-continued

|  |  |  |  |  |  |  |  |
|---|---|---|---|---|---|---|---|
| Heating process | Temperature | 80° C. | 70° C. | 70° C. | 70° C. | 70° C. | 70° C. |
|  | Time | 48 hours | 36 hours | 36 hours | 36 hours | 36 hours | 36 hours |
| Tension (N) |  | 1.176 | 0.294 | 0.294 | 0.294 | 0.294 | 0.294 |
| Blade polishing and dry wiping treatment |  | 1 time | 1 time | 1 time | 1 time | 1 time | 1 time |
| Methyl ethyl ketone wiping treatment |  | Performed | Performed | Performed | Performed | Performed | Performed |
| (Reference value) Spacing difference ($S_{reference} - S_{before}$) before and after n-hexane cleaning (nm) |  | 2.0 | 4.0 | 4.0 | 4.0 | 4.0 | 4.0 |
| Spacing difference ($S_{after} - S_{before}$) before and after methyl ethyl ketone cleaning (nm) |  | 4.0 | 25.0 | 25.0 | 28.0 | 28.0 | 28.0 |
| Aromatic polyamide support | Type | Support 1 | Support 2 | Support 3 | Support 1 | Support 1 | Support 1 |
|  | Hygroscopic coefficient | 1.4% | 1.9% | 1.7% | 1.4% | 1.4% | 1.4% |
| Evaluation of deterioration in running stability (PES) |  | 5 nm | 15 nm | 15 nm | 15 nm | 15 nm | 15 nm |

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Ferromagnetic powder |  | BaFe | BaFe | BaFe | BaFe | BaFe | BaFe | BaFe |
| Mixing ratio of non-magnetic powder in back coating layer (α-iron oxide/carbon black) |  | 60/40 | 60/40 | 60/40 | 60/40 | 60/40 | 60/40 | 80/20 |
| Heating process | Temperature | 60° C. | 60° C. | 70° C. | 80° C. | 70° C. | 70° C. | 70° C. |
|  | Time | 24 hours | 24 hours | 36 hours | 48 hours | 36 hours | 36 hours | 36 hours |
| Tension (N) |  | 0.294 | 0.294 | 0.294 | 1.960 | 0.294 | 0.294 | 0.294 |
| Blade polishing and dry wiping treatment |  | 1 time | 3 times | 1 time | 1 time | 1 time | 1 time | 1 time |
| Methyl ethyl ketone wiping treatment |  | Not performed | Not performed | Not performed | Performed | Not performed | Performed | Performed |
| (Reference value) Spacing difference ($S_{reference} - S_{before}$) before and after n-hexane cleaning (nm) |  | 4.0 | 4.0 | 4.0 | 0 | 4.0 | 4.0 | 4.0 |
| Spacing difference ($S_{after} - S_{before}$) before and after methyl ethyl ketone cleaning (nm) |  | 34.0 | 33.0 | 32.0 | 0 | 32.0 | 28.0 | 25.0 |
| Aromatic polyamide support | Type | Support 4 | Support 4 | Support 4 | Support 4 | Support 1 | Support 4 | Support 4 |
|  | Hygroscopic coefficient | 2.3% | 2.3% | 2.3% | 2.3% | 1.4% | 2.3% | 2.3% |
| Evaluation of deterioration in running stability (PES) |  | 40 nm | 35 nm | 35 nm | 50 nm | 25 nm | 25 nm | 22 nm |

The magnetic tape of the examples is a magnetic tape having an aromatic polyamide support. From the values of PES in Table 1, in the magnetic tape of the example, it can be confirmed that a deterioration in running stability after being stored in a high temperature and high humidity environment after a temperature change from a low temperature to a high temperature under high humidity is prevented.

In addition, as shown in Table 1, there was no correlation between the value of the spacing difference ($S_{reference} - S_{before}$) before and after n-hexane cleaning and the value of the spacing difference ($S_{after} - S_{before}$) before and after methyl ethyl ketone cleaning.

One aspect of the invention is effective in a technical field of a magnetic recording medium for various data storage.

What is claimed is:

1. A magnetic recording medium comprising:
    a non-magnetic support;
    a magnetic layer including a ferromagnetic powder on one surface of the non-magnetic support; and
    a back coating layer including a non-magnetic powder on the other surface of the non-magnetic support,
    wherein a difference ($S_{after} - S_{before}$) between a spacing $S_{after}$ measured by optical interferometry regarding a surface of the back coating layer after methyl ethyl ketone cleaning and a spacing $S_{before}$ measured by optical interferometry regarding the surface of the back coating layer before methyl ethyl ketone cleaning is greater than 0 nm and equal to or smaller than 30.0 nm, and
    the non-magnetic support is an aromatic polyamide support having a moisture absorption of 2.2% or less.

2. The magnetic recording medium according to claim 1, wherein the difference ($S_{after} - S_{before}$) is 4.0 nm to 28.0 nm.

3. The magnetic recording medium according to claim 1, wherein the aromatic polyamide support has a moisture absorption of 2.0% or less.

4. The magnetic recording medium according to claim 1, wherein the aromatic polyamide support has a moisture absorption of 1.0% or more and 2.0% or less.

5. The magnetic recording medium according to claim 1, further comprising:
    a non-magnetic layer including a non-magnetic powder between the non-magnetic support and the magnetic layer.

6. The magnetic recording medium according to claim 1, wherein the magnetic recording medium is a magnetic tape.

7. A magnetic recording and reproducing device comprising:
   the magnetic recording medium according to claim 1; and
   a magnetic head.

8. The magnetic recording and reproducing device according to claim 7,
   wherein the difference ($S_{after}-S_{before}$) is 4.0 nm to 28.0 nm.

9. The magnetic recording and reproducing device according to claim 7,
   wherein the aromatic polyamide support has a moisture absorption of 2.0% or less.

10. The magnetic recording and reproducing device according to claim 7,
    wherein the aromatic polyamide support has a moisture absorption of 1.0% or more and 2.0% or less.

11. The magnetic recording and reproducing device according to claim 7,
    wherein the magnetic recording medium further comprises a non-magnetic layer including a non-magnetic powder between the non-magnetic support and the magnetic layer.

12. The magnetic recording and reproducing device according to claim 7,
    wherein the magnetic recording medium is a magnetic tape.

* * * * *